US009666374B2

(12) United States Patent
Hattori

(10) Patent No.: US 9,666,374 B2
(45) Date of Patent: May 30, 2017

(54) CAPACITOR COMPONENT

(71) Applicant: Murata Manufacturing Co., Ltd., Nagaokakyo-shi, Kyoto-fu (JP)

(72) Inventor: Kazuo Hattori, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 23 days.

(21) Appl. No.: 14/797,298

(22) Filed: Jul. 13, 2015

(65) Prior Publication Data

US 2016/0027584 A1    Jan. 28, 2016

(30) Foreign Application Priority Data

Jul. 24, 2014  (JP) .................................. 2014-150645

(51) Int. Cl.

| H01G 4/30  | (2006.01) |
|---|---|
| H01G 4/224 | (2006.01) |
| H01G 4/232 | (2006.01) |
| H01G 4/12  | (2006.01) |

(52) U.S. Cl.
CPC ............... *H01G 4/30* (2013.01); *H01G 4/224* (2013.01); *H01G 4/232* (2013.01); *H01G 4/12* (2013.01)

(58) Field of Classification Search
CPC ....................................................... H01G 4/30
USPC ............................................. 361/301.4, 311
See application file for complete search history.

(56) References Cited

U.S. PATENT DOCUMENTS 6,577,486 B1    6/2003  Nishimiya et al.
8,056,199 B2 *  11/2011  Aoki .................. H01G 4/012
                                                    29/25.03

FOREIGN PATENT DOCUMENTS

| JP | 2002-531939 A | 9/2002 |
|---|---|---|
| JP | 2009-059888 A | 3/2009 |
| JP | 2010-103184 A | 5/2010 |
| JP | 2011-151224 A | 8/2011 |

* cited by examiner

*Primary Examiner* — Eric Thomas
(74) *Attorney, Agent, or Firm* — Keating & Bennett, LLP

(57) ABSTRACT

A capacitor component includes an element assembly, a first external electrode, and a second external electrode. The element assembly includes first and second internal electrode layers, a first connecting conductive layer extending along a fifth outer surface of the element assembly and connected to each of the first internal electrode layers, a first covering insulating layer covering the first connecting conductive layer, a second connecting conductive layer extending along a sixth outer surface of the element assembly and connected to each of the second internal electrode layers, and a second covering insulating layer covering the second connecting conductive layer. Only a portion of the first internal electrode layers are extended to the third outer surface and connected to the first external electrode, and only a portion of the internal electrode layers are extended to the fourth outer surface and connected to the second external electrode.

16 Claims, 21 Drawing Sheets

CAPACITOR COMPONENT

BACKGROUND OF THE INVENTION

1. Field of the Invention

The present invention relates to a capacitor component and a method of producing the same, and in particular, to a capacitor component where an electrostatic capacitance portion includes a plurality of dielectric layers and a plurality of internal electrode layers alternately laminated, and a method of producing the capacitor component.

2. Description of the Related Art

In general, a multilayer ceramic capacitor as a capacitor component includes an element assembly formed by a plurality of dielectric layers made of a ceramic material and a plurality of internal electrode layers made of a conductive material being alternately laminated, and an electrostatic capacitance portion is formed by the laminated plurality of dielectric layers and the laminated plurality of internal electrode layers.

Usually, each of a pair of internal electrode layers positioned across the dielectric layer is extended toward a mutually different direction, and thereby being directly extended to a mutually different end surface of the element assembly. Each of a pair of external electrodes is provided so as to cover the corresponding one of a pair of end surfaces of the element assembly and is connected to the corresponding one of the pair of internal electrode layers.

In this kind of multilayer ceramic capacitor, the increase in capacity can be relatively easily achieved by increasing the number of laminated layers of the dielectric layers and the internal electrode layers, but on the other hand, the equivalent series resistance (ESR) is lowered. This is caused by the total cross-sectional area of the conductive path being relatively increased with the increase of the number of laminated layers of the internal electrode layers.

Therefore, when the multilayer ceramic capacitor is used for decoupling applications, various problems due to the low ESR (for example, the increase in impedance due to the anti-resonance with another capacitor component, the oscillation of the DC-DC converter, the ringing during the transient response, and the like) may occur.

A technology to achieve a higher ESR in this type of multilayer ceramic capacitor is, for example, disclosed in JP 2010-103184 A. In the multilayer ceramic capacitor disclosed in JP 2010-103184 A, all of a plurality of internal electrode layers to be electrically connected to a first external electrode are connected by being drawn to a first side surface of the element assembly with terminal conductors provided on the first side surface interposed therebetween, and only a portion of the plurality of internal electrode layers are connected to the first external electrode by being drawn to the first end surface of the element assembly, and all of a plurality of internal electrode layers to be electrically connected to a second external electrode are connected by being drawn to a second side surface of the element assembly with terminal conductors provided on the second side surface interposed therebetween, and only a portion of the plurality of internal electrode layers are connected to the second external electrode by being drawn to the second end surface of the element assembly.

By using the multilayer ceramic capacitor disclosed in JP 2010-103184 A, compared to the case where all of the internal electrode layers are configured to be directly extended to the end surface of the element assembly, the total cross-sectional area of the conductive path can be reduced, and therefore, a higher ESR can be achieved.

However, when the multilayer ceramic capacitor disclosed in JP 2010-103184 A is used, a problem that a major limitation arises occurs with respect to the mounting on the wiring board.

That is, in the multilayer ceramic capacitor disclosed in JP 2010-103184 A, when the pair of terminal conductors are directly connected to the conductive patterns and lands provided on the wiring board with solder bonding material and the like interposed therebetween, the effect itself of the above described higher ESR is eliminated. Therefore, in the multilayer ceramic capacitor, a sufficient margin is necessary to be previously provided on the wiring board so that the pair of terminal conductors are not directly connected to the conductive patterns and lands even after the mounting to the wiring board.

Therefore, a design of a wiring board different from the wiring board corresponding to the conventional general multilayer ceramic capacitor is required.

In other words, as described above, the multilayer ceramic capacitor disclosed in JP 2010-103184 A requires a sufficient margin to be previously provided on the wiring board so that the pair of terminal conductors are not directly connected to the conductive patterns and lands on the wiring board even after the mounting to the wiring board, and as a result, requires an extra mounting space, and therefore, the high density mounting is hindered.

In addition, the multilayer ceramic capacitor disclosed in JP 2010-103184 A is in a state where not only a pair of external electrodes are exposed, but even the pair of terminal conductors are exposed on the surface of the element assembly, and therefore, the surface area of the element assembly has to be sufficiently secured so that the mutual short circuit between the pair of external electrodes and the pair of terminal conductors is prevented. Therefore, the multilayer ceramic capacitor has a difficulty in implementing even the miniaturization of itself, and the high density mounting is hindered also in this regard.

SUMMARY OF THE INVENTION

Preferred embodiments of the present invention provide a capacitor component capable of setting the ESR to a desired magnitude and suitable for high density mounting, and a method of producing the same.

A capacitor component according to a first aspect of various preferred embodiments of the present invention includes an element assembly, a first external electrode, and a second external electrode. The element assembly includes a first outer surface and a second outer surface opposing each other, a third outer surface and a fourth outer surface opposing each other, and a fifth outer surface and a sixth outer surface opposing each other. The first external electrode is disposed on the third outer surface. The second external electrode is disposed on the fourth outer surface. The element assembly includes a plurality of dielectric layers and a plurality of internal electrode layers alternately laminated in the laminating direction perpendicular or substantially perpendicular to the first outer surface. The plurality of internal electrode layers include a plurality of first internal electrode layers electrically connected to the first external electrode, and a plurality of second internal electrode layers electrically connected to the second external electrode. The element assembly further includes a first connecting conductive layer extending along the fifth outer surface and connecting to an end portion on the fifth outer surface side of each of the plurality of first internal electrode layers, and a first covering insulating layer covering the first connecting conductive layer and defining the fifth outer surface. In the capacitor component based on the first aspect of various preferred embodiments of the present invention, at least one of the plurality of first internal electrode layers are extended to the third outer surface and connected to the first external electrode, and at least one of the plurality of first internal electrode layers are separated from the third outer surface.

In the capacitor component based on the first aspect of various preferred embodiments of the present invention, the first connecting conductive layer may be extended to the third outer surface and connected to the first external electrode.

In the capacitor component based on the first aspect of various preferred embodiments of the present invention, the element assembly may further include a second connecting conductive layer extending along the sixth outer surface and connecting to an end portion on the sixth outer surface side of each of the plurality of second internal electrode layers, and a second covering insulating layer covering the second connecting conductive layer and defining the sixth outer surface. In this case, it is preferred that at least one of the plurality of second internal electrode layers are extended to the fourth outer surface and connected to the second external electrode, and at least one of the plurality of second internal electrode layers are separated from the fourth outer surface.

In the capacitor component based on the first aspect of various preferred embodiments of the present invention, the second connecting conductive layer may be extended to the fourth outer surface and connected to the second external electrode.

In the capacitor component based on the first aspect of various preferred embodiments of the present invention, the element assembly may further include a first auxiliary conductive layer positioned in a same plane perpendicular or substantially perpendicular to the laminating direction as each of the plurality of second internal electrode layers and connected to the first connecting conductive layer, and a second auxiliary conductive layer positioned in a same plane perpendicular or substantially perpendicular to the laminating direction as each of the plurality of first internal electrode layers and connected to the second connecting conductive layer.

The capacitor component based on a second aspect of various preferred embodiments of the present invention includes an element assembly, a first external electrode, and a second external electrode. The element assembly includes a first outer surface and a second outer surface opposing each other, a third outer surface and a fourth outer surface opposing each other, and a fifth outer surface and a sixth outer surface opposing each other. The first external electrode is disposed on the third outer surface. The second external electrode is disposed on the fourth outer surface. The above element assembly includes a plurality of dielectric layers and a plurality of internal electrode layers alternately laminated in the laminating direction perpendicular or substantially perpendicular to the first outer surface. The plurality of internal electrode layers include a plurality of first internal electrode layers electrically connected to the first external electrode, and a plurality of second internal electrode layers electrically connected to the second external electrode. The element assembly further includes a first connecting conductive layer extending along the fifth outer surface and connecting to an end portion on the fifth outer surface side of each of the plurality of first internal electrode layers, and a first covering insulating layer covering the first connecting conductive layer and defining the fifth outer surface. In the capacitor component based on the second aspect of various preferred embodiments of the present invention, the first connecting conductive layer is extended to the third outer surface and connected to the first external electrode.

In the capacitor component based on the second aspect of various preferred embodiments of the present invention, the element assembly may further include a second connecting conductive layer extending along the sixth outer surface and connecting to an end portion on the sixth outer surface side of each of the plurality of second internal electrode layers, and a second covering insulating layer covering the surface of the second connecting conductive layer and defining the sixth outer surface. In this case, it is preferred that the second connecting conductive layer is extended to the fourth outer surface and connected to the second external electrode.

In the capacitor component based on the second aspect of various preferred embodiments of the present invention, the element assembly may further include a first auxiliary conductive layer positioned in a same plane perpendicular or substantially perpendicular to the laminating direction as each of the plurality of second internal electrode layers and connected to the first connecting conductive layer, and a second auxiliary conductive layer positioned in a same plane perpendicular or substantially perpendicular to the laminating direction as each of the plurality of first internal electrode layers and connected to the second connecting conductive layer.

A method of producing a capacitor component based on the first aspect of various preferred embodiments of the present invention is a producing method for producing a capacitor component based on the first aspect of various preferred embodiments of the present invention, the producing method including a step of producing a laminated body where the plurality of dielectric layers and the plurality of internal electrode layers are alternately laminated in the laminating direction, and the plurality of first internal electrode layers are exposed on a fifth surface to be positioned on the fifth outer surface side of the element assembly; a step of obtaining the element assembly by forming the first connecting conductive layer and the first covering insulating layer on the fifth surface of the laminated body; and a step of forming the first external electrode and the second external electrode respectively on the third outer surface and the fourth outer surface of the element assembly. In the method for producing a capacitor component based on the first aspect of various preferred embodiments of the present invention, in the step of producing the laminated body, only a portion of the plurality of first internal electrode layers are exposed on the third surface of the laminated body to define a portion of the third outer surface of the element assembly.

A method of producing a capacitor component based on the second aspect of various preferred embodiments of the present invention is a producing method for producing a capacitor component based on the first aspect of various preferred embodiments of the present invention, the producing method including a step of producing a laminated body where the plurality of dielectric layers and the plurality of internal electrode layers are alternately laminated in the laminating direction, and the plurality of first internal electrode layers are exposed on a fifth surface to be positioned on the fifth outer surface side of the element assembly, and the plurality of second internal electrode layers are exposed on a sixth surface to be positioned on the sixth outer surface side of the element assembly; a step of obtaining the element assembly by forming the first connecting conductive layer and the first covering insulating layer on the fifth surface of the laminated body, and by forming the second connecting conductive layer and the second covering insulating layer on the sixth surface of the laminated body; and a step of forming the first external electrode and the second external electrode respectively on the third outer surface and the fourth outer surface of the element assembly. In the method for producing a capacitor component based on the first aspect of various preferred embodiments of the present invention, in the step of producing the laminated body, only a portion of the plurality of first internal electrode layers are exposed on the third surface of the laminated body to define a portion of the third outer surface of the element assembly, and only a portion of the plurality of second internal electrode layers are exposed on the fourth surface of the laminated body to be a portion of the fourth outer surface of the element assembly.

A method of producing a capacitor component based on a third aspect of various preferred embodiments of the present invention is a producing method for producing a capacitor component based on the second aspect of various preferred embodiments of the present invention, the producing method including a step of producing a laminated body where the plurality of laminated dielectric layers and the plurality of internal electrode layers are alternately laminated in the laminating direction, and the plurality of first internal electrode layers are exposed on a fifth surface to be positioned on the fifth outer surface side of the element assembly; a step of obtaining the element assembly by forming the first connecting conductive layer and the first covering insulating layer on the fifth surface of the laminated body; and a step of forming the first external electrode and the second external electrode respectively on the third outer surface and the fourth outer surface of the element assembly. In the method for producing a capacitor component based on the second aspect of various preferred embodiments of the present invention, in the step of obtaining the element assembly, the first connecting conductive layer is exposed on the third outer surface of the element assembly.

A method of producing a capacitor component based on a fourth aspect of various preferred embodiments of the present invention is a producing method for producing a capacitor component based on the second aspect of various preferred embodiments of the present invention, the producing method including a step of producing a laminated body where the plurality of laminated dielectric layers and the plurality of internal electrode layers are alternately laminated in the laminating direction, and the plurality of first internal electrode layers are exposed on a fifth surface to be positioned on the fifth outer surface side of the element assembly, and the plurality of second internal electrode layers are exposed on a sixth surface to be positioned on the sixth outer surface side of the element assembly; a step of obtaining the element assembly by forming the first connecting conductive layer and the first covering insulating layer on the fifth surface of the laminated body, and by forming the second connecting conductive layer and the second covering insulating layer on the sixth surface of the laminated body; and a step of forming the first external electrode and the second external electrode respectively on the third outer surface and the fourth outer surface of the element assembly. In the method for producing a capacitor component based on the second aspect of various preferred embodiments of the present invention, in the step of obtaining the element assembly, the first connecting conductive layer is exposed on the third outer surface of the element assembly, and the second connecting conductive layer is exposed on the fourth outer surface of the element assembly.

Here, the first covering insulating layer and the second covering insulating layer described above are sufficient to include a non-conductive layer under the practical use conditions of the capacitor component, and include, for example, a layer formed of an insulating material, a layer formed of a dielectric material, their laminated film, or the like.

According to various preferred embodiments of the present invention, a capacitor component capable of setting the ESR to a desired magnitude and suitable for high density mounting, and a method of producing the same is are provided.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Figure 1:
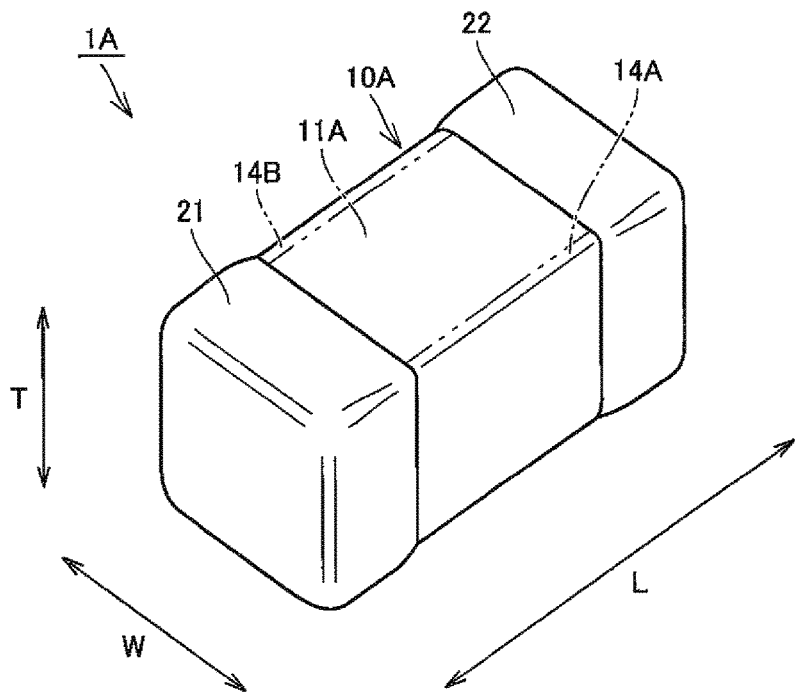
FIG. 1 is a perspective view of a multilayer ceramic capacitor according to a first preferred embodiment of the present invention.

In the following, the preferred embodiments of the present invention will be described in detail with reference to the accompanying figures. As a capacitor component to which various preferred embodiments of the present invention may be applied and a producing method thereof, a multilayer ceramic capacitor using a ceramic material as a dielectric material and a producing method thereof, and a laminated metallized film capacitor using a resin film as a dielectric material and a producing method thereof, and the like can be mentioned, and the preferred embodiments below will be described by illustrating cases of applying the present invention to the multilayer ceramic capacitor and a producing method thereof. It should be noted that in the preferred embodiments described below, the same or common portions are denoted by the same reference numerals in the figures, and a description thereof will not be repeated.

First Preferred Embodiment

First, a multilayer ceramic capacitor 1A in this preferred embodiment will be described with reference to FIGS. 1 to 4C.

As shown in FIGS. 1 to 4C, the multilayer ceramic capacitor 1A in this preferred embodiment includes an element assembly 10A, a first external electrode 21, and a second external electrode 22.

The element assembly 10A preferably has a rectangular or substantially rectangular parallelepiped shape, and includes a laminated body 11A of a rectangular or substantially rectangular parallelepiped shape, a first covering insulating layer 14A and a second covering insulating layer 14B covering predetermined portions of the laminated body 11A, and a first connecting conductive layer 15A and a second connecting conductive layer 15B. It should be noted that the shape referred to here as "rectangular or substantially rectangular parallelepiped shape" includes a shape where roundness is formed at the corner portions and edge portions of the element assembly, and a shape where negligible steps or unevenness on the whole is provided on the surface of the element assembly.

The laminated body 11A includes a plurality of dielectric layers 12 and a plurality of internal electrode layers (a plurality of first internal electrode layers 13A and a plurality of second internal electrode layers 13B) alternately laminated in the laminating direction.

The first external electrode 21 and the second external electrode 22 respectively cover one end portion and the other end portion of a pair of end portions in a predetermined direction of the element assembly 10A.

The dielectric layer 12, the first covering insulating layer 14A, and the second covering insulating layer 14B are, for example, formed of a ceramic material including barium titanate ($BaTiO_3$) as the main component. In addition, the dielectric layer 12 may include an Mn compound, Mg compound, Si compound, Co compound, Ni compound, rare earth compound, and the like as the sub-components of the ceramic powder to be the raw material of the ceramic sheet described below. On the other hand, the first internal electrode layer 13A, the second internal electrode layer 13B, the first connecting conductive layer 15A, and the second connecting conductive layer 15B are preferably formed of the metal materials typified by, for example, Ni, Cu, Ag, Pd, Ag—Pd alloy, Au, and the like.

It should be noted that the dielectric layer 12, the first covering insulating layer 14A, and the second covering insulating layer 14B are not necessarily required to include a ceramic material having the above-described barium titanate as the main component, and may be configured by using another ceramic material (for example, a ceramic material having $CaTiO_3$, $SrTiO_3$, $CaZrO_3$, and the like, as the main component) with a high dielectric constant. In addition, the first internal electrode layer 13A, the second internal electrode layer 13B, the first connecting conductive layer 15A, and the second connecting conductive layer 15B may also be configured by using other conductive materials, not limited to the above-described metallic material.

A plurality of raw material sheets where conductive pastes to define the first internal electrode layer 13A and the second internal electrode layer 13B are applied to the surfaces of the ceramic sheet (what is called a green sheet) to be the dielectric layer 12 are prepared, and these plurality of raw material sheets are laminated and bonded with pressure, such that the laminated body 11A is produced.

A pair of raw material sheets where conductive pastes to be the first connecting conductive layer 15A and the second connecting conductive layer 15B are applied to the respective surfaces of the ceramic sheet to be the first covering insulating layer 14A and the second covering insulating layer 14B are prepared, and these pair of raw material sheets are pasted and bonded with pressure on the outer surface of the above-described laminated body 11A, such that the element assembly 10A is produced.

Each of the first external electrode 21 and the second external electrode 22 includes a conductive film. The first external electrode 21 and the second external electrode 22 include, for example, a laminated film of the sinter metal layer and the plated layer. The sinter metal layer is formed by the conductive paste of Cu, Ni, Ag, Pd, Ag—Pd alloy, Au, and the like being baked, for example. The plating layer includes, for example, a Ni plating layer and a Sn plating layer covering the Ni plating layer. The plating layer may be a Cu plating layer or an Au plating layer, instead. In addition, conductive resin pastes can be also used as the first external electrode 21 and the second external electrode 22.

It should be noted that details of the production flow of the multilayer ceramic capacitor in this preferred embodiment including the production flow of the element assembly 10A and laminated body 11A described above, and the formation flow of the first external electrode 21 and second external electrode 22 described above will be described below.

Here, as shown in FIGS. 1 to 4C, in the element assembly 10A, the laminating direction of the dielectric layer 12, the first internal electrode layer 13A, and the second internal electrode layer 13B is defined as the height direction T, the direction where the first external electrode 21 and the second external electrode 22 are aligned is defined as the length direction L, and the direction perpendicular or substantially perpendicular to both of these length direction L and height direction T is defined as the width direction W, and then, in the following description, these terms will be used.

In addition, as shown in FIGS. 2 to 4C, among the six outer surfaces included in the element assembly 10A, a pair of opposite outer surfaces in the height direction T are defined as the first outer surface 10a and the second outer surface 10b, a pair of opposite outer surfaces in the length direction L are defined as the third outer surface 10c and the fourth outer surface 10d, and a pair of opposite outer surfaces in the width direction W are defined as the fifth outer surface 10e and the sixth outer surface 10f, and then, in the following description, these terms will be used.

Furthermore, as shown in FIGS. 2 to 4C, among the six surfaces included in the laminated body 11A, a pair of opposite surfaces in the height direction T are defined as the first surface 11a and the second surface 11b, a pair of opposite surfaces in the length direction L are defined as the third surface 11c and the fourth surface 11d, and a pair of opposite surfaces in the width direction W are defined as the fifth surface 11e and the sixth surface 11f, and then, in the following description, these terms will be used.

As shown in FIGS. 1 to 4C, the multilayer ceramic capacitor 1A preferably has a rectangular or substantially rectangular parallelepiped shape configured so that the outside dimension along the height direction T and the outside dimension along the width direction W are configured equally, and the outside dimension along the length direction L is longer compared to the outside dimension along the height direction T and the outside dimension along the width direction W, for example. However, the outer shape of the multilayer ceramic capacitor to which various preferred embodiments of the present invention is applicable is not limited to the rectangular or substantially rectangular parallelepiped shape.

It should be noted that as a representative value of the outside dimensions of the multilayer ceramic capacitor, for example, approximately 0.25 mm×0.125 mm×0.125 mm, 0.4 mm×0.2 mm×0.2 mm, 0.6 mm×0.3 mm×0.3 mm, 0.8× mm×0.4 mm×0.4 mm, 1.0 mm×0.5 mm×0.5 mm, 1.6 mm×0.8 mm×0.8 mm, 2.0 mm×1.25 mm×1.25 mm, 3.2 mm×1.6 mm×1.6 mm, and the like can be mentioned.

As shown in FIGS. 2 to 4C, the height direction T perpendicular or substantially perpendicular to the first outer surface 10a of the above-described element assembly 10A is set as the laminating direction, and in the height direction T being the laminating direction, a plurality of dielectric layers 12 and a plurality of internal electrode layers (including a plurality of first internal electrode layers 13A and a plurality of second internal electrode layers 13B) are laminated.

In addition, the first external electrode 21 and the second external electrode 22 are respectively disposed on the third outer surface 10c and the fourth outer surface 10d. It should be noted that the first external electrode 21 is extended to the portions positioned closer to the third outer surface 10c of the first outer surface 10a, second outer surface 10b, fifth outer surface 10e, and the sixth outer surface 10f, and the second external electrode 22 is extended to the portions positioned closer to the fourth outer surface 10d of the first outer surface 10a, second outer surface 10b, fifth outer surface 10e, and the sixth outer surface 10f.

Figure 2:
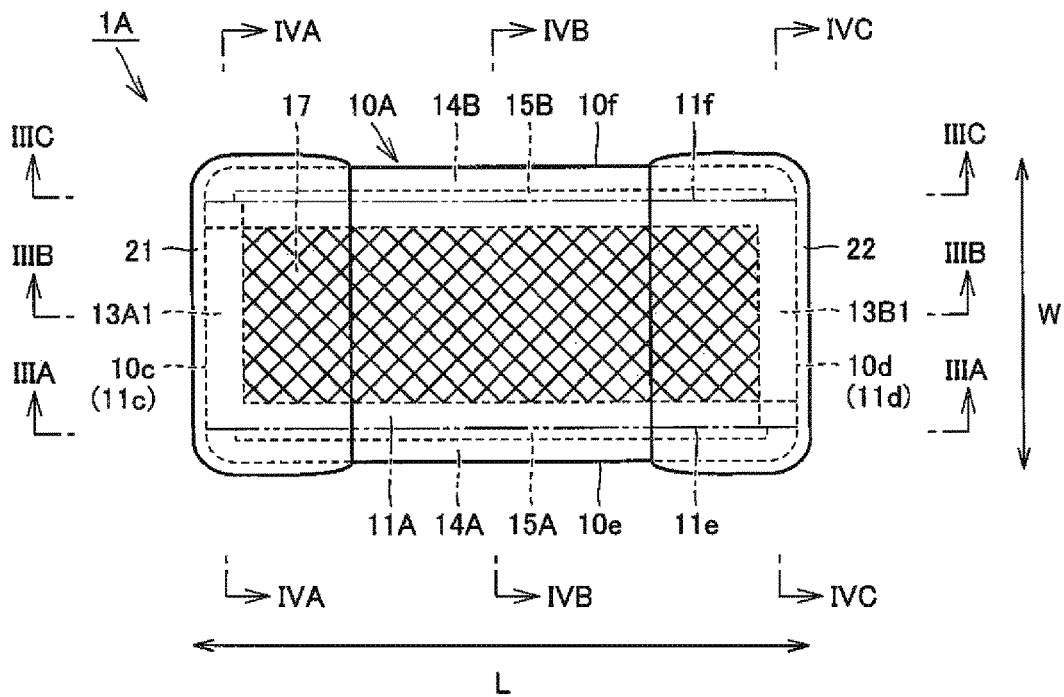
FIG. 2 is a plan view of the multilayer ceramic capacitor according to the first preferred embodiment of the present invention.
Figure 3A:
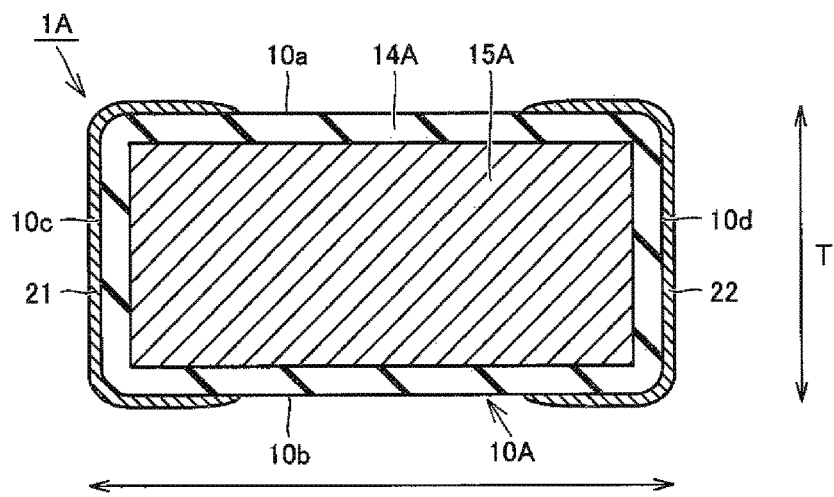
FIGS. 3A to 3C are schematic cross-sectional views of the multilayer ceramic capacitor according to the first preferred embodiment of the present invention taken along lines IIIA-IIIA, IIIB-IIIB, and IIIC-IIIC shown in FIG. 2.
Figure 3B:
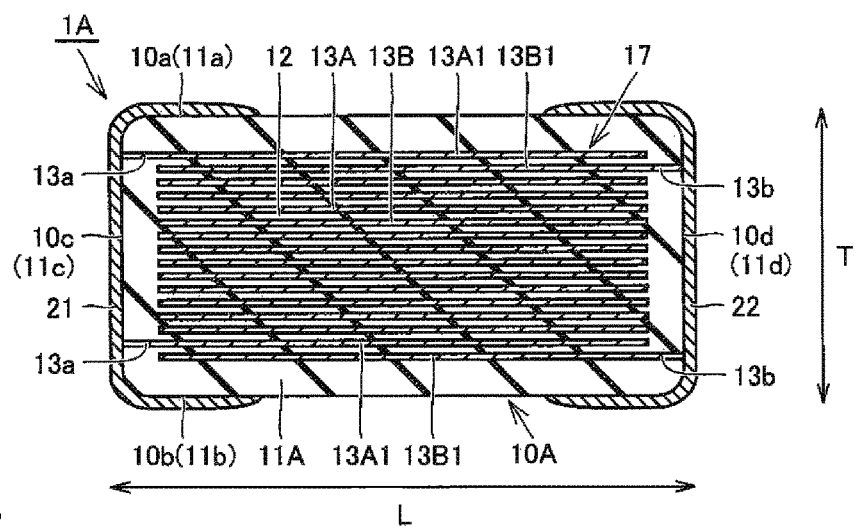
Figure 4A:
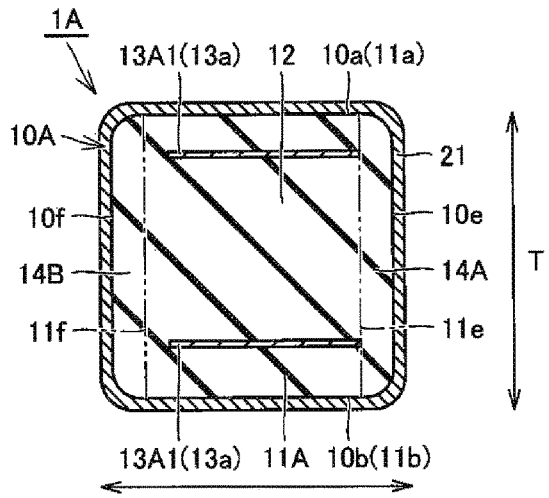
FIGS. 4A to 4C are schematic cross-sectional views of the multilayer ceramic capacitor according to the first preferred embodiment of the present invention taken along lines IVA-IVA, IVB-IVB, and IVC-IVC shown in FIG. 2.
Figure 4B:
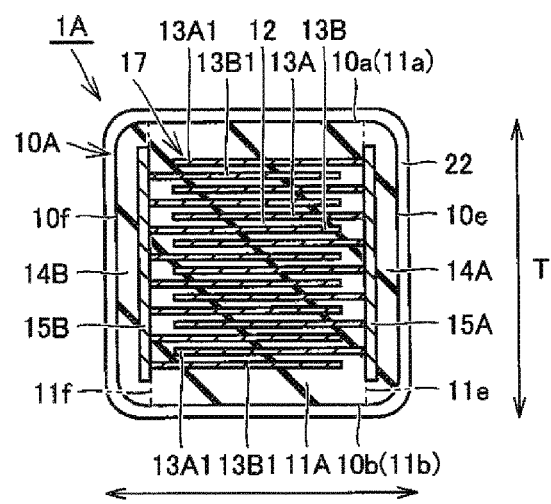

As shown in FIGS. 2, 3B, and 4B, the electrostatic capacitance portion 17 of the rectangular or substantially rectangular parallelepiped shape is disposed inside the element assembly 10A and inside the laminated body 11A. The electrostatic capacitance portion 17 is formed by a plurality of the first internal electrode layers 13A of the rectangular shape in plan view and a plurality of the second internal electrode layers 13B of the rectangular shape in plan view being arranged alternately along the height direction T with the dielectric layers 12 interposed therebetween. Here, the first internal electrode layer 13A refers to an internal electrode layer electrically connected to the first external electrode 21, and the second internal electrode layer 13B refers to an internal electrode layer electrically connected to the second external electrode 22.

In more detail, the electrostatic capacitance portion 17 is preferably configured by a plurality of capacitor elements electrically connected to each other in parallel, and each of the plurality of capacitor elements is preferably configured by one first internal electrode layer 13A and one second internal electrode layer 13B being overlapped across one dielectric layer 12 along the height direction T.

As a result, the state where a plurality of capacitor elements are electrically connected in parallel between the first external electrode 21 and the second external electrode 22 is achieved, and a larger capacity is achieved by increasing the number of laminated layers of the above-described dielectric layer 12 and the above-described internal electrode layer (the first internal electrode layer 13A and the second internal electrode layer 13B). It should be noted that although the number of these laminated layers is not particularly limited, in a general multilayer ceramic capacitor, the total number of internal electrode layers to be laminated is approximately several tens to several thousands, for example.

As shown in FIGS. 2, 3A, and 4B, the first connecting conductive layer 15A is disposed between the electrostatic capacitance portion 17 and the fifth outer surface 10e described above. In more detail, the first connecting conductive layer 15A preferably has a rectangular or substantially rectangular shape in plan view, and is disposed on the fifth surface 11e of the laminated body 11A. The first connecting conductive layer 15A connects a plurality of first internal electrode layers 13A to each other inside the element assembly 10A.

More specifically, each of the plurality of first internal electrode layers 13A, whose end portion on the fifth outer surface 10e side is extended from the above-described electrostatic capacitance portion 17 toward the fifth outer surface 10e side, is connected to the above-described first connecting conductive layer 15A. Here, any of the plurality of second internal electrode layers 13B is not extended from the electrostatic capacitance portion 17 toward the fifth outer surface 10e side, and therefore, any of these second internal electrode layers 13B are unconnected to the first connecting conductive layer 15A.

As a result, only the plurality of first internal electrode layers 13A are electrically connected to each other in parallel with the first connecting conductive layer 15A interposed between the electrostatic capacitance portion 17 and the fifth outer surface 10e. Therefore, in an arbitrary cross section (that is, the cross section as shown in FIG. 4B) crossing the electrostatic capacitance portion 17 of the element assembly 10A, the first connecting conductive layer 15A and the plurality of first internal electrode layers 13A have a comb-shaped configuration as a whole.

In addition, the first covering insulating layer 14A is disposed between the electrostatic capacitance portion 17 and the fifth outer surface 10e described above, and the fifth outer surface 10e is defined by the first covering insulating layer 14A. In more detail, the first covering insulating layer 14A covers the first connecting conductive layer 15A and the fifth surface 11e of the laminated body 11A. The first covering insulating layer 14A is intended to prevent that the first connecting conductive layer 15A is exposed to the outside on the fifth outer surface 10e side of the element assembly 10A.

Here, when viewed along the width direction W, the first connecting conductive layer 15A does not reach the surface of the laminated body 11A in any of the length direction L and the height direction T. As a result, the first connecting conductive layer 15A is completely buried inside the element assembly 10A, and the first connecting conductive layer 15A is unconnected to any of the first external electrode 21 and the second external electrode 22.

Figure 3C:
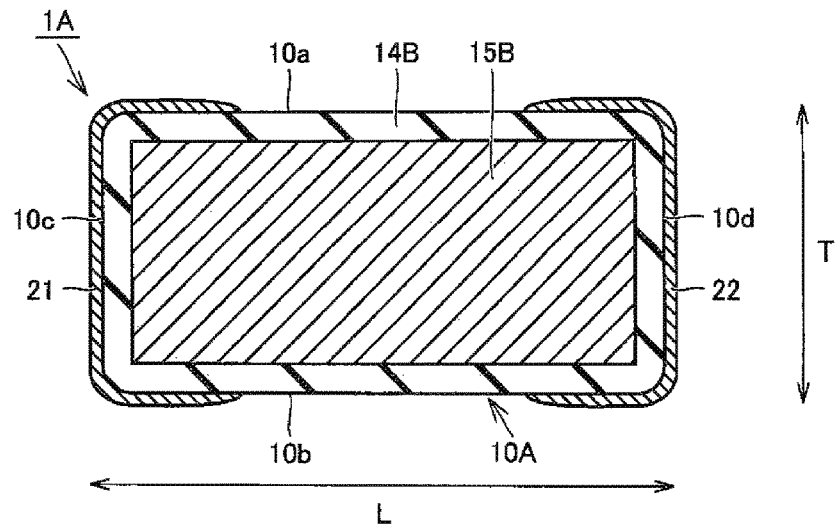

As shown in FIGS. 2, 3C, and 4B, the second connecting conductive layer 15B is disposed between the electrostatic capacitance portion 17 and the sixth outer surface 10f described above, and in the same manner as the first connecting conductive layer 15A connects the plurality of first internal electrode layers 13A to each other inside the element assembly 10A, the second connecting conductive layer 15B also connects a plurality of second internal electrode layers 13B to each other inside the element assembly 10A.

More specifically, each of the plurality of second internal electrode layers 13B, whose end portion positioned on the sixth outer surface 10f side is extended from the above-described electrostatic capacitance portion 17 toward the sixth outer surface 10f side, is connected to the second connecting conductive layer 15B. Here, any of the plurality of first internal electrode layers 13A is not extended from the electrostatic capacitance portion 17 toward the sixth outer surface 10f side, and therefore, any of these first internal electrode layers 13A are unconnected to the second connecting conductive layer 15B.

Therefore, in an arbitrary cross section (that is, the cross section as shown in FIG. 4B) crossing the electrostatic capacitance portion 17 of the element assembly 10A, the second connecting conductive layer 15B and the plurality of second internal electrode layers 13B have a comb-shaped configuration as a whole.

In addition, the second covering insulating layer 14B is disposed between the electrostatic capacitance portion 17 and the sixth outer surface 10f described above, and the sixth outer surface 10f is defined by the second covering insulating layer 14B. In more detail, the second covering insulating layer 14B covers the second connecting conductive layer 15B and the sixth surface 11f of the laminated body 11A. The second covering insulating layer 14B is intended to prevent that the second connecting conductive layer 15B is exposed to the outside on the sixth outer surface 10f side of the element assembly 10A.

Here, when viewed along the width direction W, the second connecting conductive layer 15B does not reach the surface of the laminated body 11A in any of the length direction L and the height direction T. As a result, the second connecting conductive layer 15B is completely buried inside the element assembly 10A, and the second connecting conductive layer 15B is unconnected to any of the first external electrode 21 and the second external electrode 22.

As shown in FIGS. 2, 3B, and 4A, some of the plurality of first internal electrode layers 13A are configured as the first internal electrode layers for connection 13A1 including the connecting portions 13a extended from the electrostatic capacitance portion 17 to the third outer surface 10c and connected to the first external electrode 21.

On the other hand, each of the first internal electrode layers 13A except the first internal electrode layers for connection 13A1 does not include a connecting portion 13a, and is unconnected to the first external electrode 21.

In addition, each of the first internal electrode layers 13A including the first internal electrode layers for connection 13A1 is unconnected to the second external electrode 22.

It should be noted that as shown in the figure, among the plurality of first internal electrode layers 13A, only the layer closest to the first outer surface 10a of the element assembly 10A and the layer closest to the second outer surface 10b are configured as the first internal electrode layers for connection 13A1. However, various preferred embodiments of the present invention may include other first internal electrode layers 13A as the first internal electrode layers for connection 13A1.

Figure 4C:
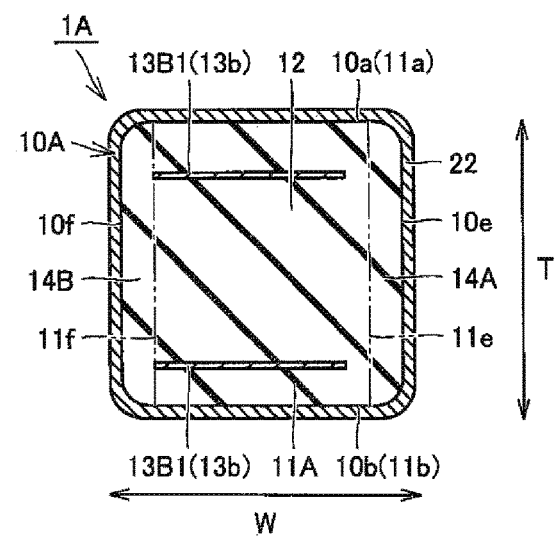

As shown in FIGS. 2, 3B, and 4C, some of the plurality of second internal electrode layers 13B are configured as the second internal electrode layers for connection 13B1 including the connecting portions 13b extended from the electrostatic capacitance portion 17 to the fourth outer surface 10d and connected to the second external electrode 22.

On the other hand, each of the second internal electrode layers 13B except the second internal electrode layers for connection 13B1 is unconnected to the second external electrode 22.

In addition, each of the second internal electrode layers 13B including the second internal electrode layers for connection 13B1 is unconnected to the first external electrode 21.

It should be noted that as shown in the figure, among the plurality of second internal electrode layers 13B, only the layer closest to the first outer surface 10a and the layer closest to the second outer surface 10b are configured as the second internal electrode layers for connection 13B1. However, various preferred embodiments of the present invention may include other second internal electrode layers 13B as the second internal electrode layers for connection 13B1.

As described above, all of the plurality of first internal electrode layers 13A are connected by the first connecting conductive layer 15A, and only the first internal electrode layers for connection 13A1 being a portion of the plurality of first internal electrode layers 13A are connected to the first external electrode 21. In addition, all of the plurality of second internal electrode layers 13B are connected by the second connecting conductive layer 15B, and only the second internal electrode layers for connection 13B1 being a portion of the plurality of second internal electrode layers 13B are connected to the second external electrode 22. Therefore, compared to the case where all of the first internal electrode layers and all of the second internal electrode layers are respectively extended directly to the third outer surface and the fourth outer surface and connected to the first external electrode and the second external electrode, it is possible to reduce the cross-sectional areas of the conductive paths between the electrostatic capacitance portion 17 and the first external electrode 21, and between the electrostatic capacitance portion and the second external electrode 22. Therefore, it is possible to increase the resistance in the portion, and to achieve higher ESR of the multilayer ceramic capacitor.

On the other hand, there is a state where both of the first connecting conductive layer 15A and the second connecting conductive layer 15B are buried inside the element assembly 10A. Therefore, the first connecting conductive layer 15A and the second connecting conductive layer 15B are not directly connected to the conductive patterns and lands provided on the wiring board with the solder bonding material and the like interposed therebetween during the mounting, and therefore, the desired ESR is reliably obtained. Furthermore, the multilayer ceramic capacitor including only two conventional general external electrodes is easily replaced, and the substitution is smoothly achieved without the need for design changes and the like of the wiring board. In addition, by adopting the configuration, it is easy to secure the distance between the first external electrode and the second external electrode 22 in designing, and therefore, the miniaturization of the multilayer ceramic capacitor itself is also possible.

Therefore, by adopting the structure as in the multilayer ceramic capacitor 1A in this preferred embodiment, and by appropriately adjusting the number of the first internal electrode layers for connection 13A1 and the second internal electrode layers for connection 13B1 respectively connected directly to the first external electrode 21 and the second external electrode 22, it is possible to set the ESR to a desired magnitude, and the high-density mounting is achieved.

It should be noted that as described above, among the plurality of first internal electrode layers 13A and the plurality of second internal electrode layers 13B, the layer closest to the first outer surface 10a and the layer closest to the second outer surface 10b are configured as the first internal electrode layer for connection 13A1 and the second internal electrode layer for connection 13B1. Therefore, in any of the cases where the first outer surface 10a or the second outer surface 10b is mounted so as to face the wiring board, the same electrical characteristics are obtained, lower ESL (equivalent series impedance) is achieved, and the mounting freedom becomes higher.

Next, the laminated structure of the above-described laminated body 11A and the assembly structure of the above-described element assembly 10A will be described with reference to these FIGS. 5 and 6.

Figure 5:
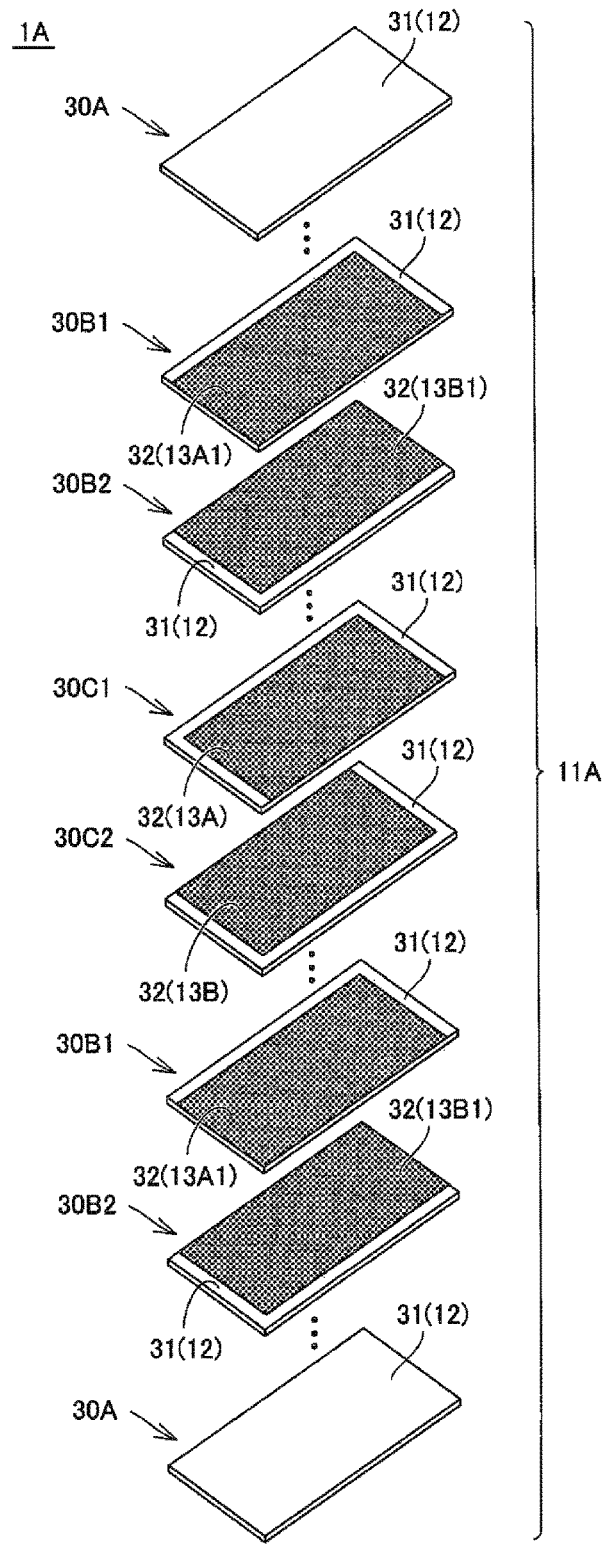
FIG. 5 is an exploded perspective view showing the laminated structure of the laminated body of the multilayer ceramic capacitor according to the first preferred embodiment of the present invention.

As shown in FIG. 5, the laminated body 11A is produced with the material sheet group including a plurality of material sheets different in configuration 30A, 30B1, 30B2, 30C1, and 30C2 as the material, and in more detail, produced by the plurality of material sheets different in configuration 30A, 30B1, 30B2, 30C1, and 30C2 being laminated in a predetermined order by predetermined numbers and bonded with pressure.

The material sheet 30A includes only a ceramic body 31 on whose surface conductive patterns are not provided. The material sheet 30A is to constitute the dielectric layers 12 to be positioned between the electrostatic capacitance portion 17 and the first outer surface 10a and between the electrostatic capacitance portion 17 and the second outer surface 10b of the multilayer ceramic capacitor 1A.

The material sheets 30B1 and 30B2 are those where conductive patterns 32 of a predetermined shape configured to constitute the first internal electrode layer for connection 13A1 are provided on the surface of the ceramic body 31. The conductive patterns 32 are provided to define the first internal electrode layer for connection 13A1 or the second internal electrode layers for connection 13B1. In addition, the ceramic body 31 in the material sheets 30B1 and 30B2 is provided to define mainly the dielectric layer 12 included in the electrostatic capacitance portion 17 of the multilayer ceramic capacitor 1A.

The material sheets 30C1 and 30C2 are those where conductive patterns 32 of a predetermined shape are provided on the surface of the ceramic body 31. The conductive patterns 32 are to constitute the first internal electrode layers 13A except the first internal electrode layers for connection 13A1 or the second internal electrode layers 13B except the second internal electrode layers for connection 13B1. In addition, the ceramic body 31 in the material sheets 30C1 and 30C2 is provided to define mainly the dielectric layer 12 included in the electrostatic capacitance portion 17 of the multilayer ceramic capacitor 1A.

Figure 6:
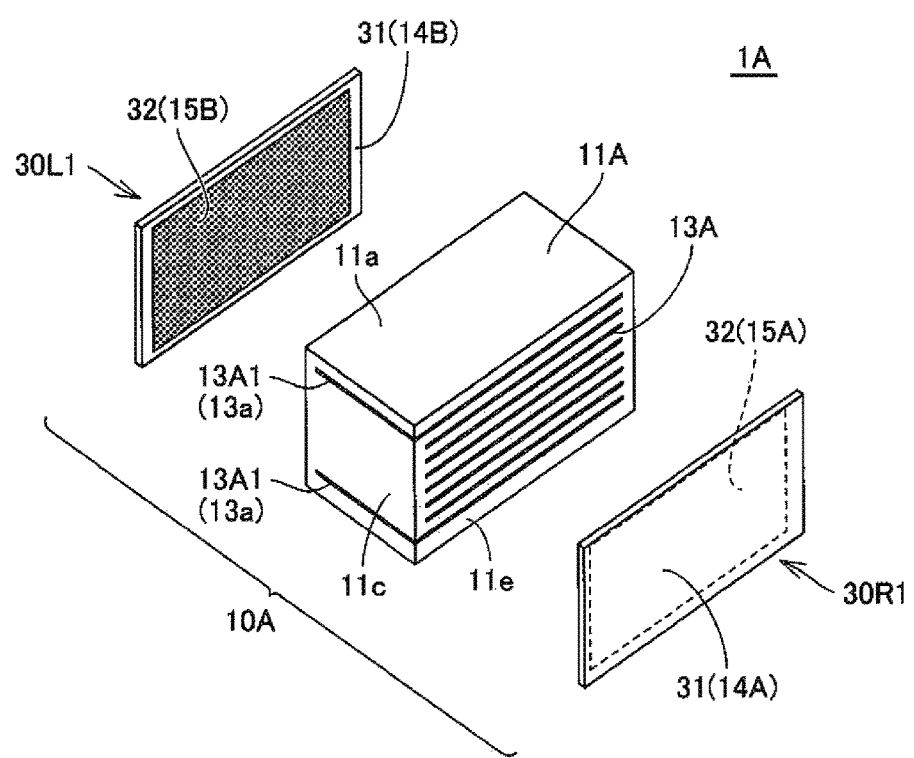
FIG. 6 is an exploded perspective view of the multilayer ceramic capacitor according to the first preferred embodiment of the present invention showing an assembly structure of an element assembly.

The laminated body 11A produced by the plurality of material sheets different in configuration 30A, 30B1, 30B2, 30C1, and 30C2 being laminated in a predetermined order by predetermined numbers and bonded with pressure is to have a shape as shown in FIG. 6.

Specifically, on the first surface 11a and second surface 11b, the conductive patterns are not exposed, and the entire surface is to be covered by the ceramic material.

On the third surface 11c, only the end portion of the connecting portion 13a of the first internal electrode layer for connection 13A1 is exposed, and on the fifth surface 11e, only the end portion of the first internal electrode layer 13A (including the first internal electrode layer for connection 13A1) is exposed.

In addition, although not shown in FIG. 6, on the fourth surface 11d, only the end portion of the connecting portion 13b of the second internal electrode layer for connection 13B1 is exposed, and on the sixth surface 11f, only the end portion of the second internal electrode layer 13B is exposed.

As shown in FIG. 6, the material sheet 30R1 is pasted on the fifth surface 11e of the laminated body 11A, and the material sheet 30L1 is pasted on the sixth surface 11f, such that the element assembly 10A is produced.

The material sheets 30R1 and 30L1 are those where conductive patterns 32 of a predetermined shape are provided on the surface of the ceramic body 31. The conductive patterns 32 are provided to define the first connecting conductive layer 15A or the second connecting conductive layer 15B. In addition, the ceramic body 31 is provided to define the first covering insulating layer 14A or the second covering insulating layer 14B.

Next, the production flow of the multilayer ceramic capacitor in this preferred embodiment will be described in detail with reference to FIG. 7.

Figure 7:
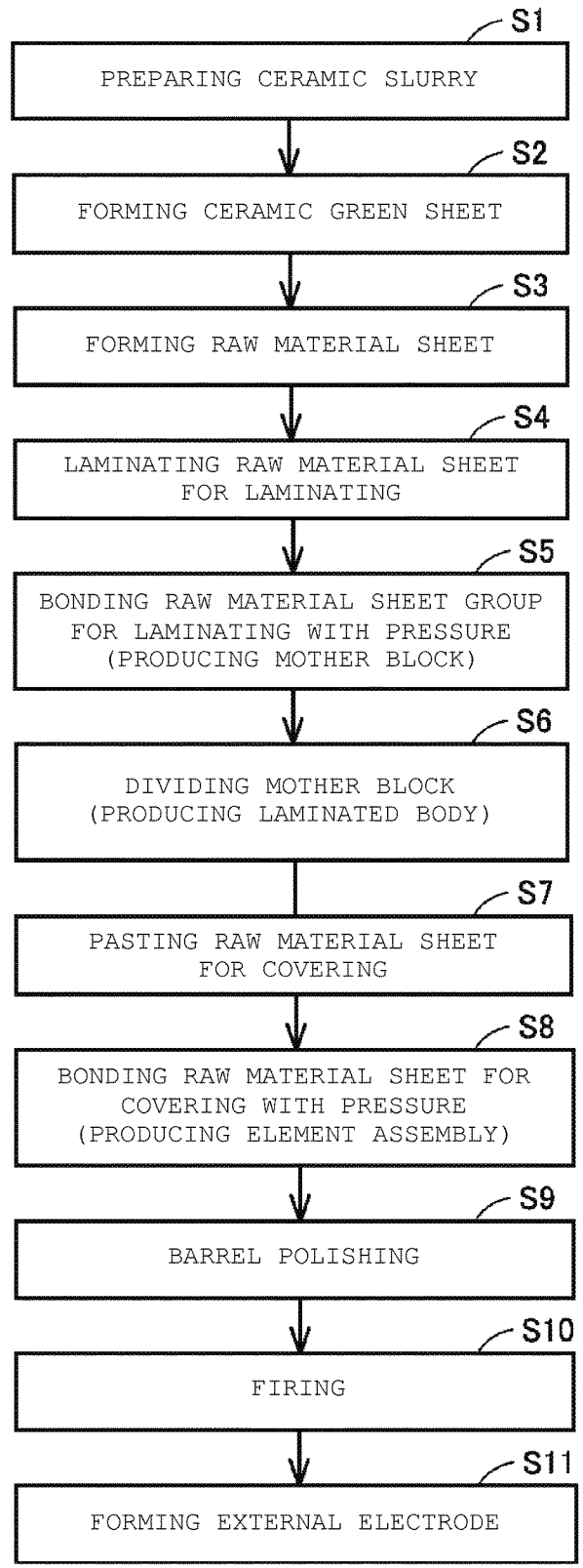
FIG. 7 is a diagram showing schematically a production flow of the multilayer ceramic capacitor according to the first preferred embodiment of the present invention.

As shown in FIG. 7, in the production of the multilayer ceramic capacitor 1A in this preferred embodiment, first, ceramic slurry is prepared (step S1). Specifically, ceramic powder, a binder, a solvent, and the like are mixed at a predetermined mixing ratio, such that the ceramic slurry is formed.

Next, a ceramic green sheet is formed (step S2). Specifically, the ceramic slurry is formed into a sheet on a carrier film using a die coater, gravure coater, micro gravure coater, and the like, such that the ceramic green sheet is produced.

Next, a raw material sheet is formed (step S3). Specifically, conductive paste is applied to the ceramic green sheet by using the ink-jet method, the screen printing method, the gravure printing method, and the like so as to have a predetermined pattern, such that the raw material sheet where the predetermined conductive pattern is provided on the ceramic green sheet is formed.

Here, the raw material sheet to be produced includes a raw material sheet for laminating having a layout such that when each of the material sheets are set as a unit for each of the material sheets 30B1, 30B2, 30C1, and 30C2 shown in FIG. 5, a plurality of the units are spread so that the material sheets of the same shape are aligned in a matrix in a plane, and a raw material sheet for covering having the layout such that when each of the material sheets are set as a unit for each of the material sheets 30R1 and 30L1 shown in FIG. 6, a plurality of the units are spread so that the material sheets of the same shape are aligned in a matrix in a plane.

It should be noted that the material sheet 30B1 and the material sheet 30B2 preferably have the same shape or substantially the same shape, and therefore, as the raw material sheet for laminating including these, those having the same conductive pattern can be used. In addition, the material sheet 30C1 and the material sheet 30C2 also have the same shape, and therefore, as the raw material sheet for laminating including these sheets, those sheets having the same conductive pattern are able to be used. Furthermore, the material sheet 30R1 and the material sheet 30R2 also preferably have the same shape or substantially the same shape, and therefore, as the raw material sheet for covering including these sheets, those sheets having the same conductive pattern are able to be used.

It should be noted that as the raw material sheet for laminating, those sheets including only the ceramic green sheet produced without going through the above-described step S3 (that is, those to be the material sheet 30A) are also prepared, in addition to those having the above-described conductive patterns.

Next, the raw material sheet for laminating is laminated (step S4). Specifically, the above-described plurality of raw material sheets for laminating are laminated in accordance with a predetermined rule so that a plurality of conductive patterns are to be arranged in a predetermined manner inside the raw material sheet group for laminating after the lamination.

Next, the raw material sheet group for laminating is bonded with pressure, such that a mother block is produced (step S5). Specifically, the raw material sheet group for laminating is pressurized along the laminating direction by use of, for example, the isostatic press method and the like to be bonded with pressure, so as to produce the mother block.

Next, the mother block is divided, and the laminated body 11A is produced (step S6). Specifically, the mother block is divided into a matrix form along a predetermined cut line by the press-cutting or the cutting with a dicing machine being performed, such that the cutout of the above-described laminated body 11A is performed.

In the steps of the mother block being divided and the laminated body 11A being produced, the cutting is performed so that the plurality of first internal electrode layers 13A (including the first internal electrode layers for connection 13A1) are exposed on the fifth surface 11e of the laminated body 11A, and the plurality of second internal electrode layers 13B (including the second internal electrode layers for connection 13B1) are exposed on the sixth surface 11f of the laminated body 11A, and furthermore, the cutting is performed so that the first internal electrode layers for connection 13A1 are exposed on the third surface 11c of the laminated body 11A, and the second internal electrode layers for connection 13B1 are exposed on the fourth surface 11d of the laminated body 11A (see FIG. 6).

In this case, the cutting is performed so that the first internal electrode layer for connection 13A1 and the second internal electrode layer for connection 13B1 are exposed, such that the respective end portions of these first internal electrode layers for connection 13A1 and the respective end portions of these second internal electrode layers for connection 13B1 are respectively to be positioned in alignment so as to overlap in the height direction T. Thus, in the steps described below, it becomes possible to connect the respective end portions to the first external electrode 21 and the second external electrode 22.

Next, the raw material sheet for covering is pasted to the laminated body 11A (step S7). Specifically, the material sheets 30R1 and 30L1 as the raw material sheets for covering are respectively positioned and pasted on the fifth surface 11e and the sixth surface 11f of the laminated body 11A.

In the pasting, the raw material sheet for covering having a larger shape than the outer surface of the laminated body 11A is placed on an elastic body, and this is punched out by the laminated body 11A being pressed against the raw material sheet for covering placed on the elastic body.

Next, the material sheets 30R1 and 30L1 are bonded with pressure to the laminated body 11A, such that the element assembly 10A is produced (step S8). Specifically, the laminated body 11A after the material sheets 30R1 and 30L1 are pasted is set in a state of being heated to a predetermined temperature, and in the state, the exposed surfaces of the material sheets 30R1 and 30L1 are mutually pressed to the laminated body 11A side by use of an elastic body and the like, such that the heat pressure bonding processing is performed. As a result, the adhesion of the material sheets 30R1 and 30L1 to the laminated body 11A is improved, and the element assembly 10A is produced.

Next, the barrel polishing of the element assembly 10A is performed (step S9). Specifically, the element assembly 10A is sealed in a small box, referred to as "barrel", with the media balls having a higher hardness than the ceramic material, and the barrel is rotated, such that the polishing of the element assembly 10A is performed. As a result, the curved roundness is to be provided on the outer surface (in particular, the corner portion and the edge portion) of the element assembly 10A.

Next, the firing of the element assembly 10A is performed (step S10). Specifically, the element assembly 10A is heated to a predetermined temperature, such that the sinter processing of the ceramic material and the conductive material included in the element assembly 10A are performed.

Next, the first external electrode 21 and the second external electrode 22 are formed (step S11). Specifically, a metal film is formed by conductive paste being applied to the end portion of the portion including the third outer surface 10c of the element assembly 10A and the end portion of the portion including the fourth outer surface 10d, and after the sinter processing on the formed metal film is performed, Ni plating and Sn plating are applied to the metal film in this order, such that the first external electrode 21 and the second external electrode 22 are formed on the outer surface of the element assembly 10A.

By going through the above described series of steps, the production of the multilayer ceramic capacitor 1A having the structure shown in FIGS. 1 to 4 is completed.

By adopting the production flow of the multilayer ceramic capacitor described above, it is possible to produce the multilayer ceramic capacitor 1A including the structure as described above, and to produce relatively easily a multilayer ceramic capacitor capable of setting the ESR to a desired magnitude and suitable for high-density mounting.

Next, a particularly suitable configuration of the multilayer ceramic capacitor 1A in this preferred embodiment will be described with reference to FIG. 8.

Figure 8:
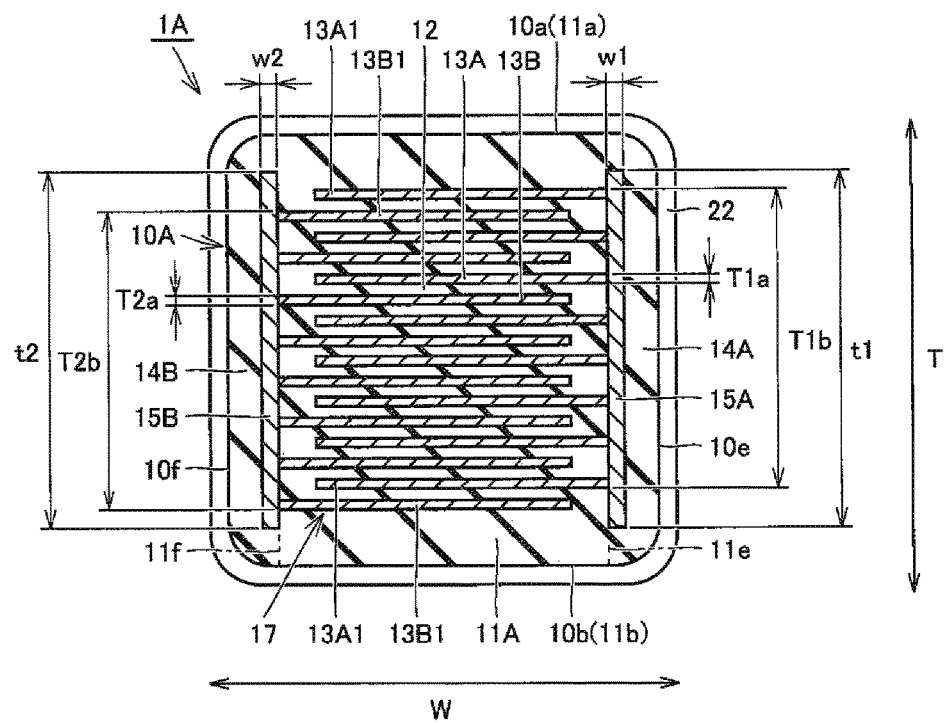
FIG. 8 is a schematic cross-sectional view including the electrostatic capacitance portion of the multilayer ceramic capacitor according to the first preferred embodiment of the present invention.

As shown in FIG. 8, it is preferred that the thickness w1 of the first connecting conductive layer 15A in the width direction W is greater than the thickness T1a of each of the plurality of first internal electrode layers 13A in the height direction T, and the thickness w2 of the second connecting conductive layer 15B in the width direction W is greater than the thickness T2a of each of the plurality of second internal electrode layers 13B in the height direction T.

By configuring in this way, in the connecting portions between the first connecting conductive layer 15A and the plurality of first internal electrode layer 13A and the connecting portions between the second connecting conductive layer 15B and the plurality of second internal electrode layers 13B, the conductive material diffusing between them increases, and therefore, it is possible to connect them more securely, and to obtain a higher bonding strength after the bonding.

In addition, it is preferred that the dimension t1 of the first connecting conductive layer 15A in the height direction T is configured larger than the distance T1b between the outer end portions of the first internal electrode layers positioned at both ends in the height direction T of the plurality of first internal electrode layers 13A (including the first internal electrode layers for connection 13A1), and the dimension t2 of the second connecting conductive layer 15B in the height direction T is configured larger than the distance T2b between the outer end portions of the second internal electrode layers positioned at both ends in the height direction T of the plurality of second internal electrode layers 13B (including the second internal electrode layers for connection 13B1).

By configuring in this way, even when a relative deviation occurs in the forming position of the first connecting conductive layer 15A with respect to the first internal electrode layer 13A, and even when a relative deviation occurs in the forming position of the second connecting conductive layer 15B with respect to the second internal electrode layer 13B, it is possible to connect them more securely, and to obtain more stable electric characteristics.

First Modification

In the following, a multilayer ceramic capacitor 1B according to a first modification of a preferred embodiment of the present invention will be described with reference to FIG. 9.

Figure 9:
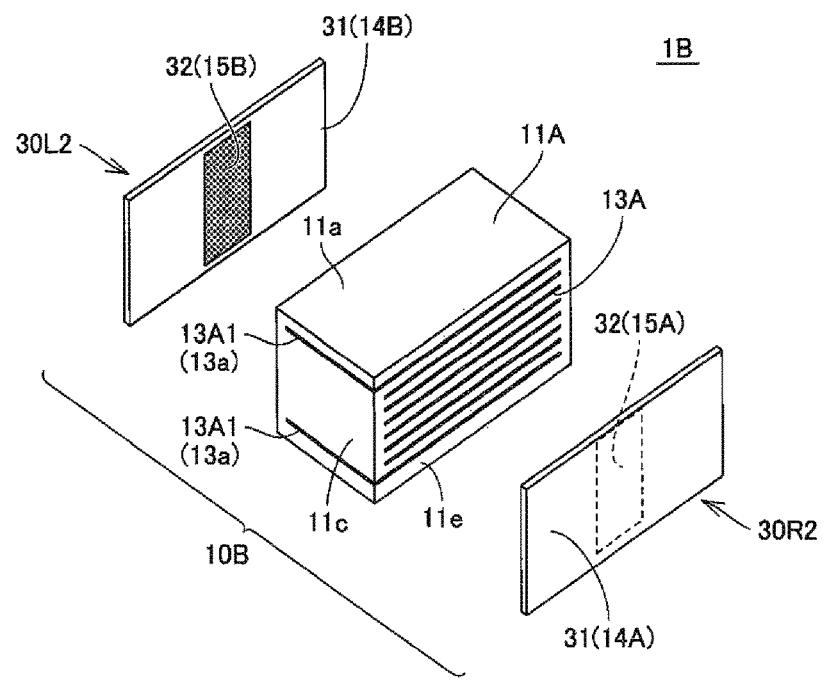
FIG. 9 is an exploded perspective view showing the assembly structure of the element assembly of a multilayer ceramic capacitor according to a first modification of a preferred embodiment of the present invention.

As shown in FIG. 9, the multilayer ceramic capacitor 1B according to the first modification includes a laminated body 11A preferably having the same or substantially the same structure as the structure shown in the first preferred embodiment described above, and is different from the first preferred embodiment described above in that the element assembly 10B is produced using the material sheets 30R2 and 30L2 having a configuration different from that of the material sheets 30R1 and 30L1 shown in the first preferred embodiment described above.

Specifically, the material sheets 30R2 and 30L2 are different from the material sheets 30R1 and 30L1 described above in that the conductive patterns 32 of the material sheets 30R2 and 30L2 are configured small in the length direction L.

When configured in this manner, unlike in the first preferred embodiment described above, the first connecting conductive layer 15A is not connected to the entire region along the length direction L of the end portions of the plurality of first internal electrode layers 13A, and is to be connected to only a portion, and the second connecting conductive layer 15B is not connected to the entire region along the length direction L of the end portions of the plurality of second internal electrode layers 13B, and is to be connected to only a portion.

Even in the case of a multilayer ceramic capacitor 1B of the above configuration, the electrical connection aspect of the various conductive layers inside the element assembly 10B is the same as that of the first preferred embodiment described above. Therefore, the same effect as the effect described in the above first preferred embodiment is obtained. In addition, adjusting the size of the conductive patterns 32 in the length direction L to be the first connecting conductive layer 15A and the second connecting conductive layer 15B enables the ESR of the multilayer ceramic capacitor to be set to a desired magnitude. Thus, the shape and the size of the first connecting conductive layer 15A and the second connecting conductive layer 15B are not limited in particular, and are able to be changed appropriately.

Second Modification

In the following, the multilayer ceramic capacitor 1C according to a second modification of a preferred embodiment of the present invention will be described with reference to FIG. 10.

Figure 10:
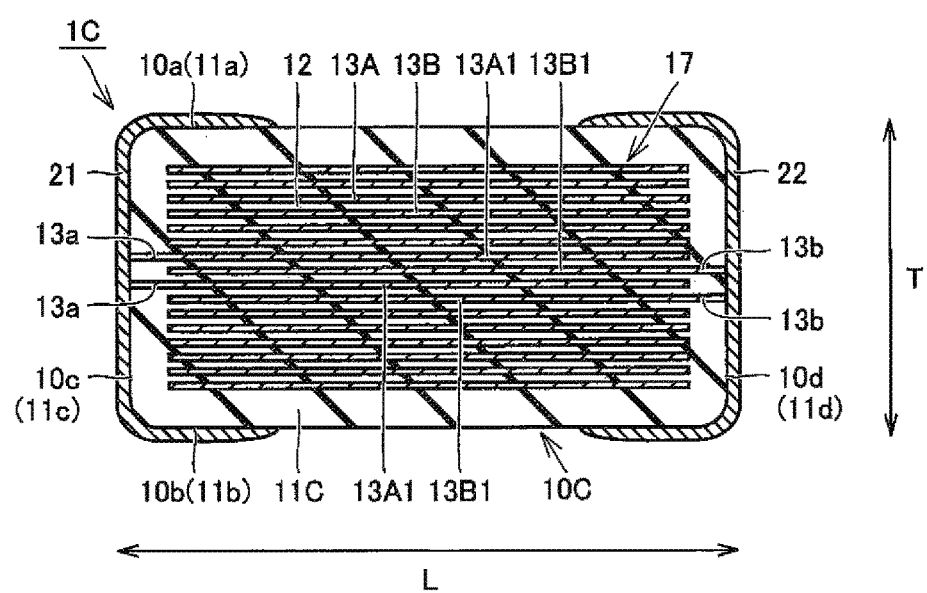
FIG. 10 is a schematic cross-sectional view of a multilayer ceramic capacitor according to a second modification of a preferred embodiment of the present invention.

As shown in FIG. 10, the multilayer ceramic capacitor 1C according to the second modification includes the element assembly 10C (laminated body 11C) having the structure different from the structure shown in the first preferred embodiment described above, whereas other configurations are preferably the same or substantially the same as those of the first preferred embodiment described above.

Specifically, a plurality of first internal electrode layers 13A positioned in the vicinity of the central portion in the height direction T are configured selectively as the first internal electrode layers for connection 13A1 and the second internal electrode layers for connection 13B1.

Even in the case of such a configuration, the same effect as the effect described in the above first preferred embodiment is obtained, and in particular, during the mounting on the wiring board, even in any of the cases where the first outer surface 10a of the element assembly 10C is mounted so as to face the wiring board and where the second outer surface 10b of the element assembly 10C is mounted so as to face the wiring board, the same electrical characteristics are obtained, and the degree of freedom of the mounting is increased. Thus, the above effect can be obtained as long as the internal electrode layers for connection are configured in line symmetry or substantial line symmetry with respect to the central position in the height direction T during the selection of the internal electrode layers for connection, and therefore, which internal electrode layer is to be selected as the internal electrode layer for connection is appropriately changeable.

It should be noted that even in the case where the internal electrode layers for connection are not selected in line symmetry or substantial line symmetry as described above, the electrical characteristics are not significantly different even when any one of the first outer surface and the second outer surface of the element assembly is mounted toward the wiring board side, and therefore, when the difference in the electrical characteristics is acceptable, such a selection is also naturally acceptable.

Third Modification

In the following, the multilayer ceramic capacitor 1D according to a third modification of a preferred embodiment of the present invention will be described with reference to FIGS. 11 and 12.

Figure 11:
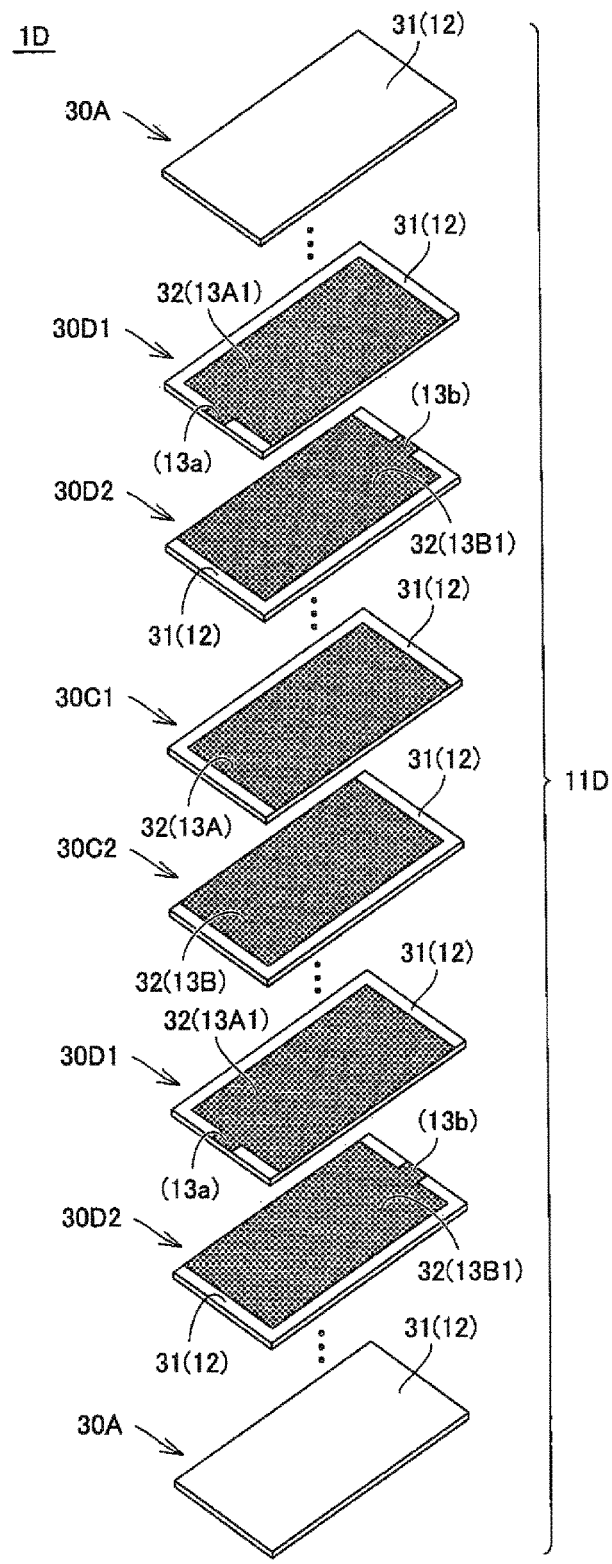
FIG. 11 is an exploded perspective view showing the laminated structure of the laminated body of a multilayer ceramic capacitor according to a third modification of a preferred embodiment of the present invention.
Figure 12:
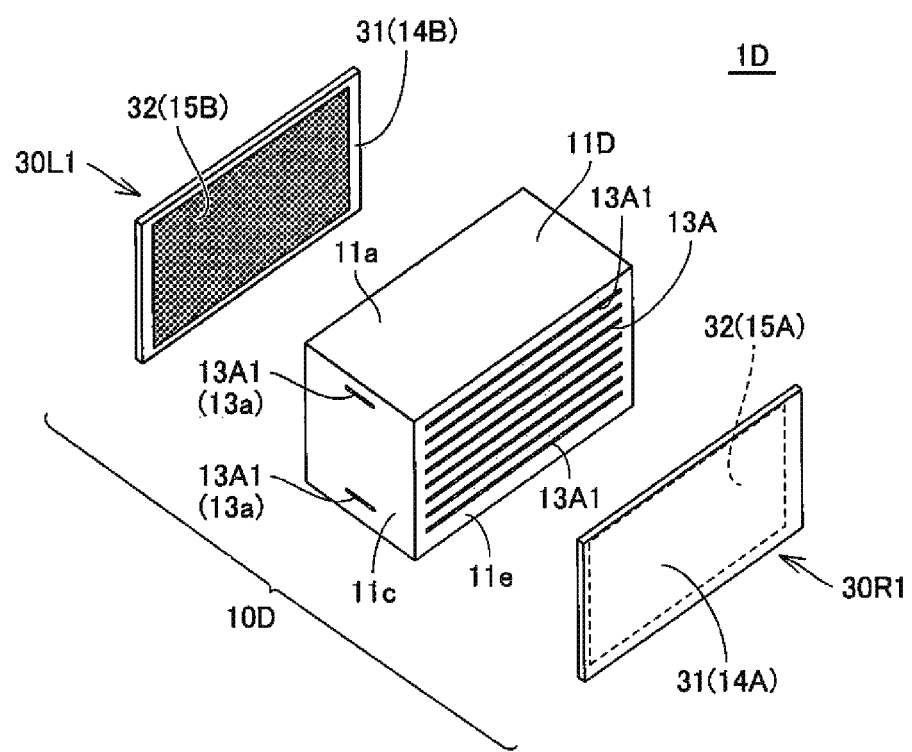
FIG. 12 is an exploded perspective view showing the assembly structure of the element assembly of the multilayer ceramic capacitor according to the third modification of a preferred embodiment of the present invention.

As shown in FIGS. 11 and 12, the multilayer ceramic capacitor 1D according to the third modification includes the laminated body 11D (element assembly 10D) including the connecting portions 13a and 13b having the configuration different from the configuration shown in the first preferred embodiment described above, whereas other configurations are preferably the same or substantially the same as those of the first preferred embodiment described above.

Specifically, as shown in FIG. 11, the laminated body 11D includes the material sheets 30D1 and 30D2 instead of the material sheets 30B1 and 30B2 shown in the first preferred embodiment described above. In the material sheets 30D1 and 30D2, the dimension along the width direction W of connecting portions 13a and 13b is configured to be smaller than the dimension along the width direction W of the electrostatic capacitance portion 17, in the conductive patterns 32 to be the first internal electrode layer for connection 13A1 and the second internal electrode layer for connection 13B1 disposed on the surface of the ceramic body 31.

Even when configured in this manner, the same effect as the effect described in the above first preferred embodiment is obtained. Furthermore, when configured in this manner, it is possible to set the ESR to a desired magnitude at a higher degree of freedom by not only appropriately adjusting the number of the first internal electrode layer for connection 13A1 and the second internal electrode layer for connection 13B1 respectively connected directly to the first external electrode 21 and the second external electrode 22, but also appropriately adjusting the sizes of the connecting portions 13a and 13b being the portions connected to the first external electrode 21 and the second external electrode 22.

Fourth Modification

In the following, the multilayer ceramic capacitor 1E according to a fourth modification of a preferred embodiment of the present invention will be described with reference to FIGS. 13A to 15.

Figure 13A:
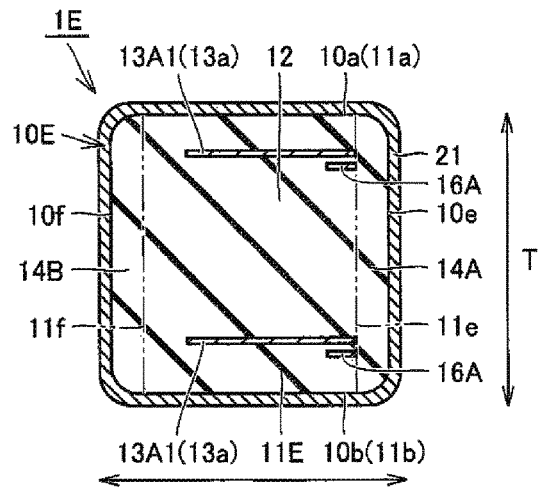
FIGS. 13A to 13C are schematic cross-sectional views of a multilayer ceramic capacitor according to a fourth modification of a preferred embodiment of the present invention.
Figure 13B:
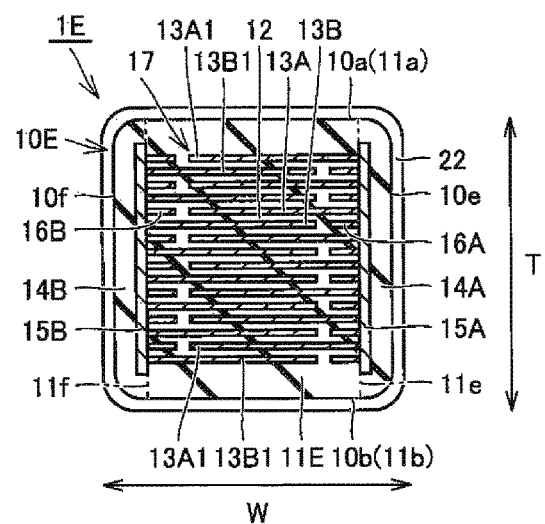
Figure 13C:
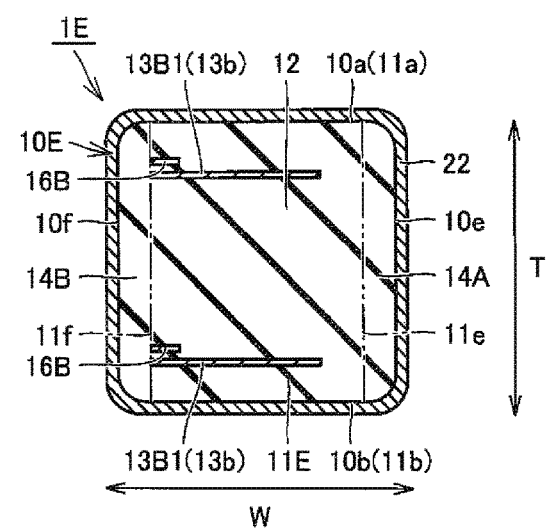

As shown in FIGS. 13A to 13C, the multilayer ceramic capacitor 1E according to the fourth modification includes a structure different from that of the first preferred embodiment described above in that the multilayer ceramic capacitor 1E includes a plurality of first auxiliary conductive layers 16A and a plurality of second auxiliary conductive layers 16B inside the element assembly 10E and inside the laminated body 11E.

Specifically, each of the plurality of first auxiliary conductive layers 16A is positioned in the same plane perpendicular or substantially perpendicular to the height direction T as the corresponding one of the plurality of second internal electrode layers 13B, and positioned apart from the second internal electrode layer 13B between the plurality of second internal electrode layers 13B and the fifth outer surface 10e. The end portion of each of the plurality of first auxiliary conductive layers 16A reaches the fifth surface 11e of the laminated body 11E, and is connected to the first connecting conductive layer 15A.

On the other hand, each of the plurality of second auxiliary conductive layers 16B is positioned in the same plane perpendicular or substantially perpendicular to the height direction T as the corresponding one of the plurality of first internal electrode layers 13A, and positioned apart from the first internal electrode layer 13A between the plurality of first internal electrode layers 13A and the sixth outer surface 10f. The end portion of each of the plurality of second auxiliary conductive layers 16B reaches the sixth surface 11f of the laminated body 11E, and is connected to the second connecting conductive layer 15B.

Figure 14:
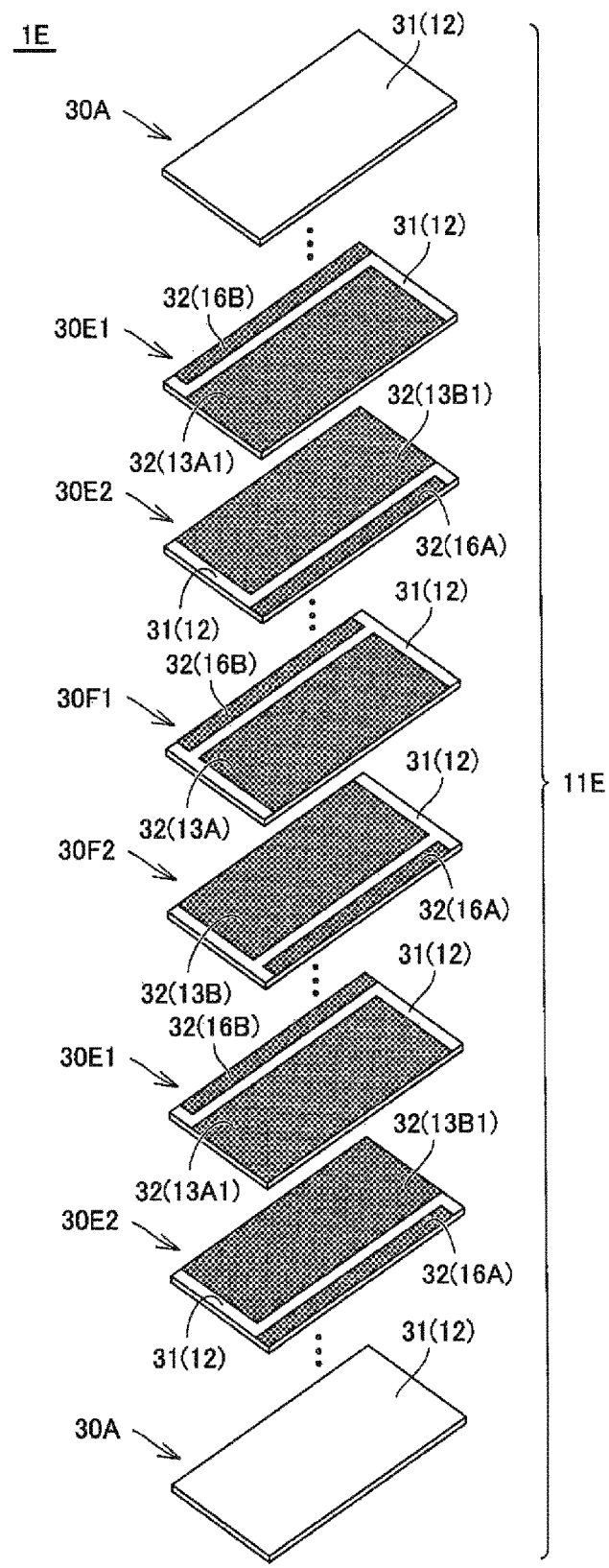
FIG. 14 is an exploded perspective view showing the laminated structure of the laminated body of the multilayer ceramic capacitor according to the fourth modification of a preferred embodiment of the present invention.
Figure 15:
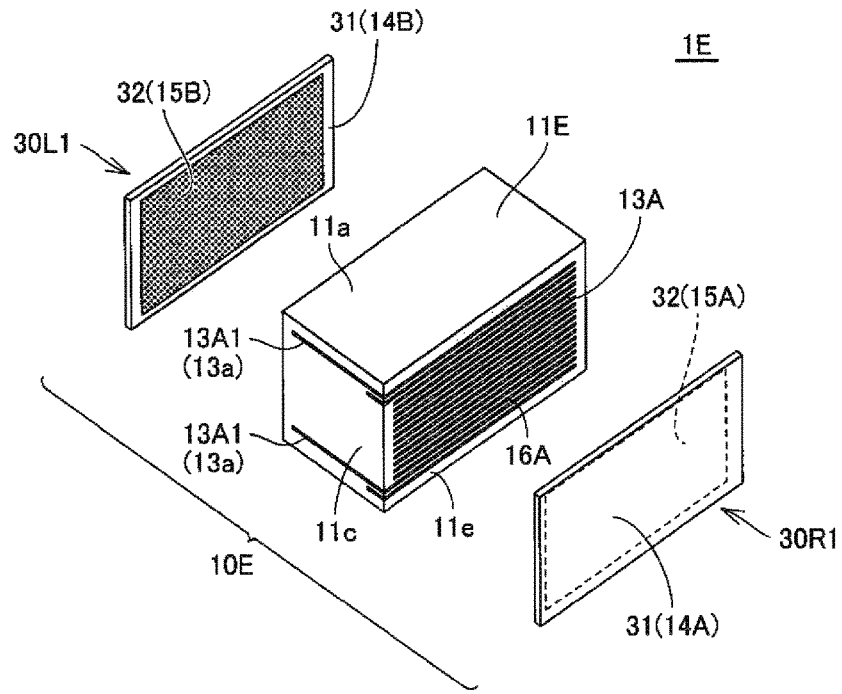
FIG. 15 is an exploded perspective view showing the assembly structure of the element assembly of the multilayer ceramic capacitor according to the fourth modification of a preferred embodiment of the present invention.
Figure 16:
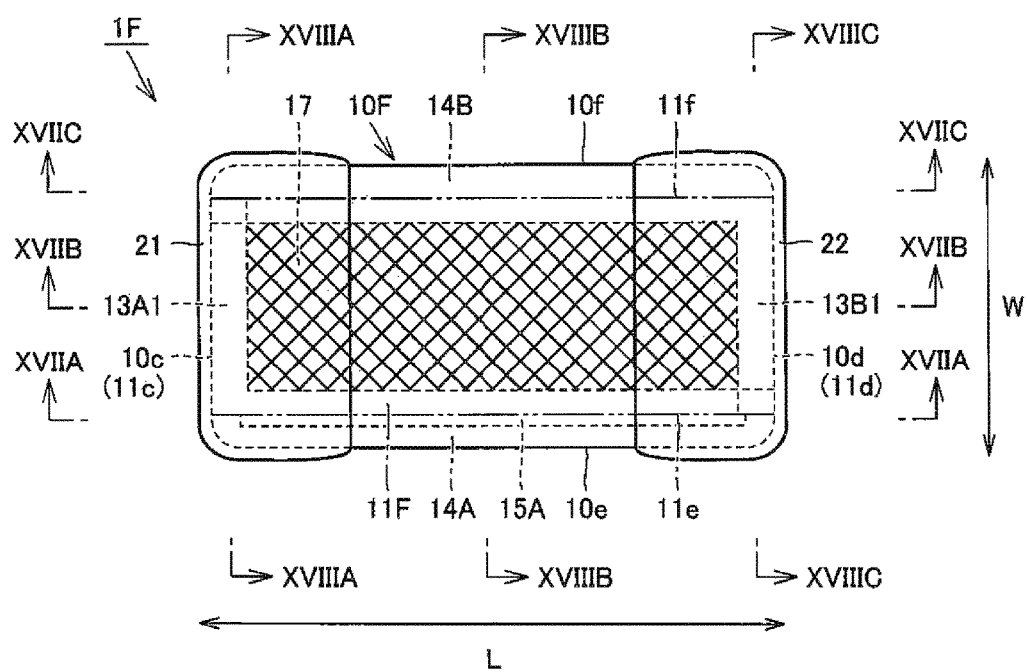
FIG. 16 is a plan view of a multilayer ceramic capacitor according to a second preferred embodiment of the present invention of a preferred embodiment of the present invention.
Figure 17A:
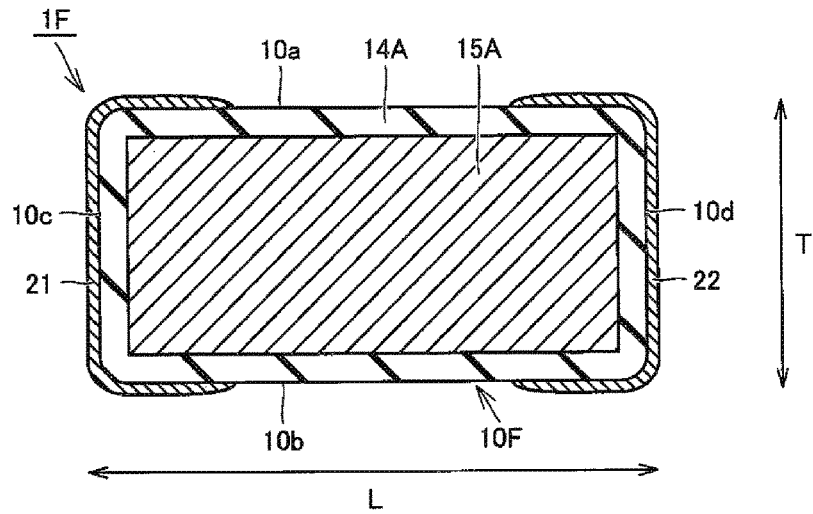
FIGS. 17A to 17C are schematic cross-sectional views of the multilayer ceramic capacitor according to the second preferred embodiment of the present invention taken along lines XVIIA-XVIIA, XVIIB-XVIIB, and XVIIC-XVIIC shown in FIG. 16.
Figure 17B:
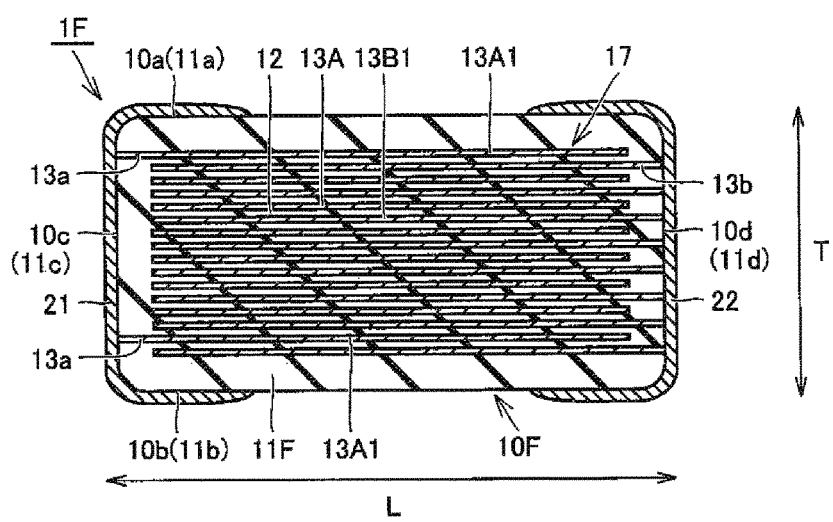
Figure 17C:
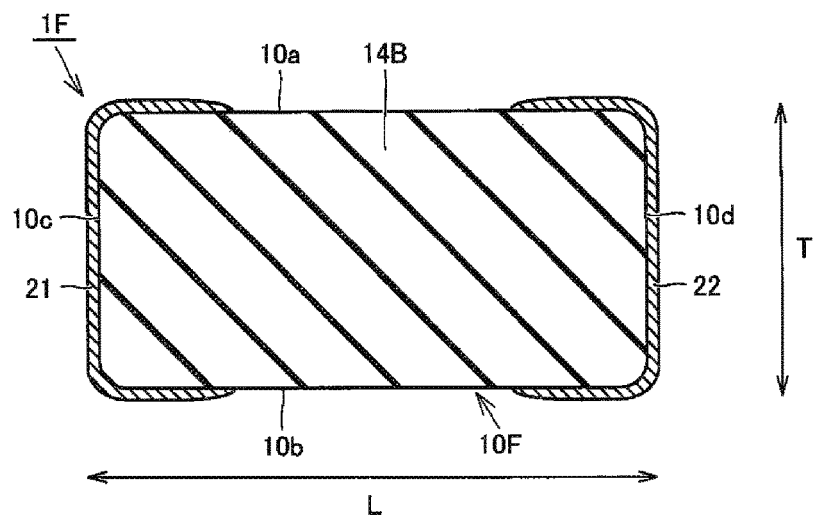
Figure 18A:
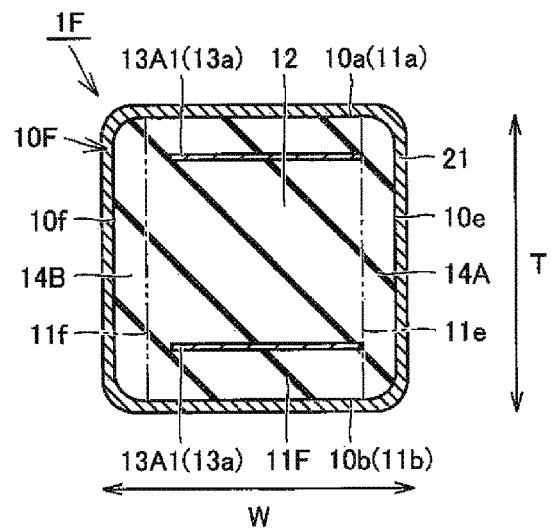
FIGS. 18A to 18C are schematic cross-sectional views of the multilayer ceramic capacitor according to the second preferred embodiment of the present invention taken along lines XVIIIA-XVIIIA, XVIIIB-XVIIIB, and XVIIIC-XVIIIC shown in FIG. 16.
Figure 18B:
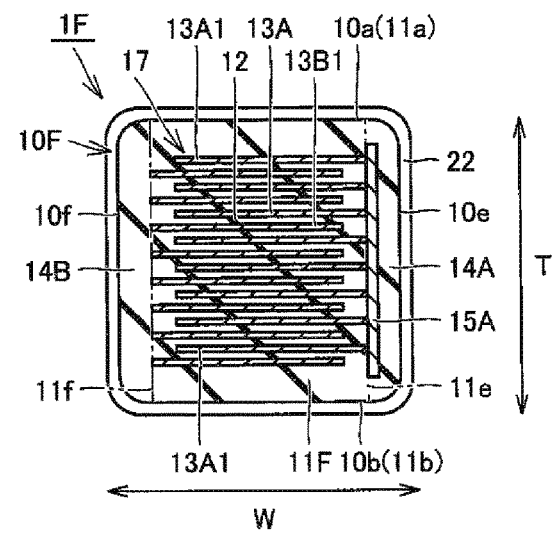
Figure 18C:
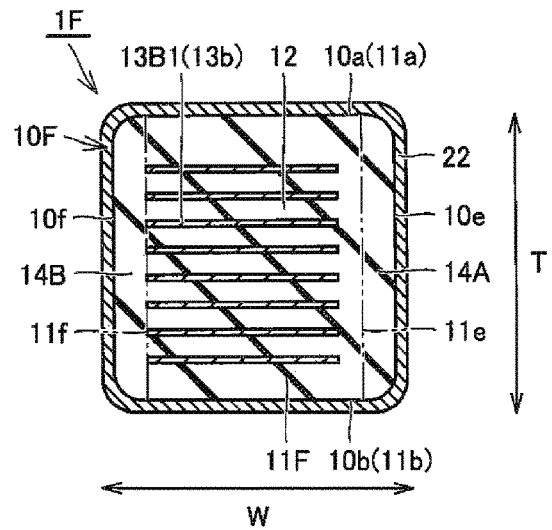

The multilayer ceramic capacitor 1E of the above configuration is achieved by the laminated structure of the laminated body 11E shown in FIG. 14 and the assembly structure of the element assembly 10E shown in FIG. 15.

As shown in FIG. 14, the laminated body 11E is produced with the material sheet group including a plurality of material sheets different in configuration 30A, 30E1, 30E2, 30F1, and 30F2 as the material.

The conductive pattern 32 of the material sheet 30E1 constitutes the first internal electrode layer for connection 13A1 configured to reach only the third surface 11c and the fifth surface 11e of the laminated body 11E, and the second auxiliary conductive layer 16B configured to reach only the fourth surface 11d and the sixth surface 11f. The conductive pattern 32 of the material sheet 30E2 constitutes the second internal electrode layer for connection 13B1 configured to reach only the fourth surface 11d and the sixth surface 11f of the laminated body 11E, and the first auxiliary conductive layer 16A configured to reach only the third surface 11c and the fifth surface 11e.

The material sheets 30F1 and 30F1 are those where conductive patterns 32 of a predetermined shape are provided on the surface of the ceramic body 31. The conductive pattern 32 of the material sheet 30F1 constitutes the first internal electrode layers 13A except the first internal electrode layer for connection 13A1 configured to reach only the fifth surface 11e of the laminated body 11E, and the second auxiliary conductive layer 16B configured to reach only the sixth surface 11f. The conductive pattern 32 of the material sheet 30F2 constitutes the second internal electrode layers 13B except the second internal electrode layer for connection 13B1 configured to reach only the sixth surface 11f of the laminated body 11E, and the first auxiliary conductive layer 16A configured to reach only the fifth surface 11e.

Even when configured in this manner, the same effect as the effect described in the above first preferred embodiment is obtained.

Furthermore, when configured in this manner, the conductive patterns 32 are positioned densely along the laminating direction on the fifth surface 11e and the sixth surface 11f of the laminated body 11E, and the equilibrium of the sum of the thicknesses of the laminated body 11E is achieved.

Thus, the equilibrium of the sum of the thicknesses of the laminated body 11E is achieved, such that the step is less likely to occur on the surface or inside of the element assembly 10E during the pressure bonding, and therefore, the occurrence and the like of the peeling or structural defects of the dielectric layer and the conductive layer caused by the step are prevented in advance.

In addition, with the above structure, a plurality of first auxiliary conductive layers 16A and a plurality of second auxiliary conductive layers 16B are respectively connected to the first connecting conductive layer 15A and the second connecting conductive layer 15B, and therefore, the binding force of each of the layers inside the element assembly 10E increases, and the effect that the mechanical strength of the element assembly 10E is improved and that the occurrence of peeling and cracks is significantly reduced or prevented are also obtained.

Second Preferred Embodiment

In the following, a multilayer ceramic capacitor 1F in this preferred embodiment will be described with reference to FIGS. 16 to 20.

As shown in FIGS. 16 to 18C, in the structure of the first internal electrode layer 13A, the first internal electrode layer for connection 13A1, and the first connecting conductive layer 15A electrically connected to the first external electrode and their peripheral structure, the multilayer ceramic capacitor 1F in this preferred embodiment has the same configuration as those in the first preferred embodiment described above. On the other hand, in the various conductive layers electrically connected to the second external electrode 22 and their peripheral structure, the multilayer ceramic capacitor 1F has configurations different from those in the first preferred embodiment described above.

Specifically, in the multilayer ceramic capacitor 1F in this preferred embodiment, all of the plurality of second internal electrode layers are configured as the second internal electrode layers for connection 13B1 including connecting portions 13b, and are connected to the second external electrode 22.

Furthermore, the second connecting conductive layer 15B is not disposed inside the element assembly 10F, and the sixth surface 11f of the laminated body 11F is covered only by the second covering insulating layer 14B.

Figure 19:
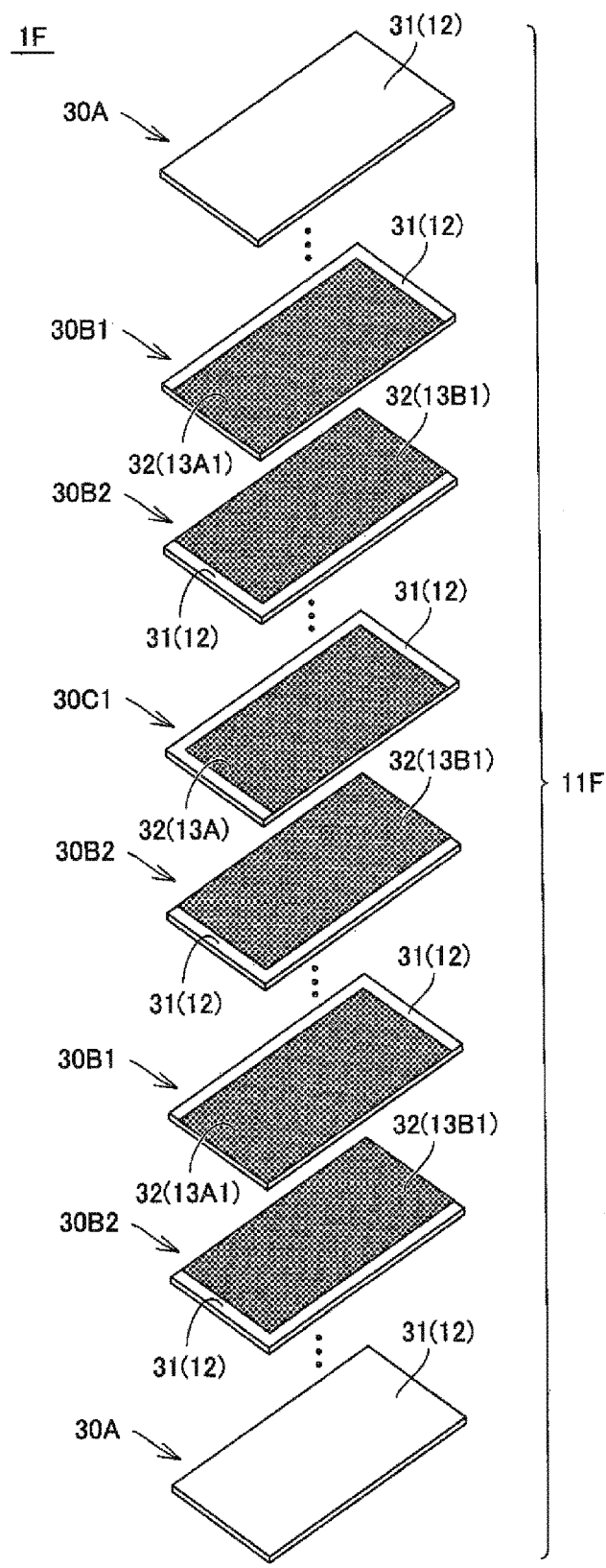
FIG. 19 is an exploded perspective view showing the laminated structure of the laminated body of the multilayer ceramic capacitor according to the second preferred embodiment of the present invention.
Figure 20:
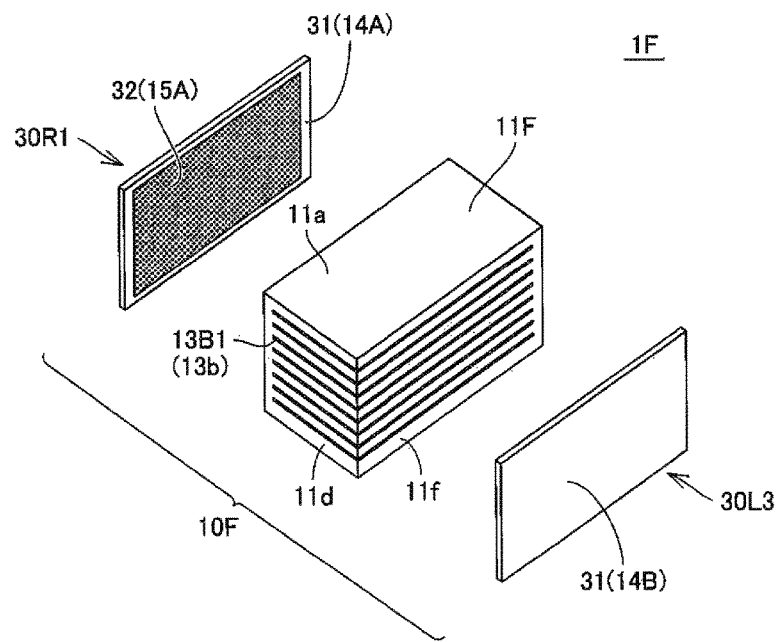
FIG. 20 is an exploded perspective view showing the assembly structure of the element assembly of the multilayer ceramic capacitor according to the second preferred embodiment of the present invention.
Figure 21:
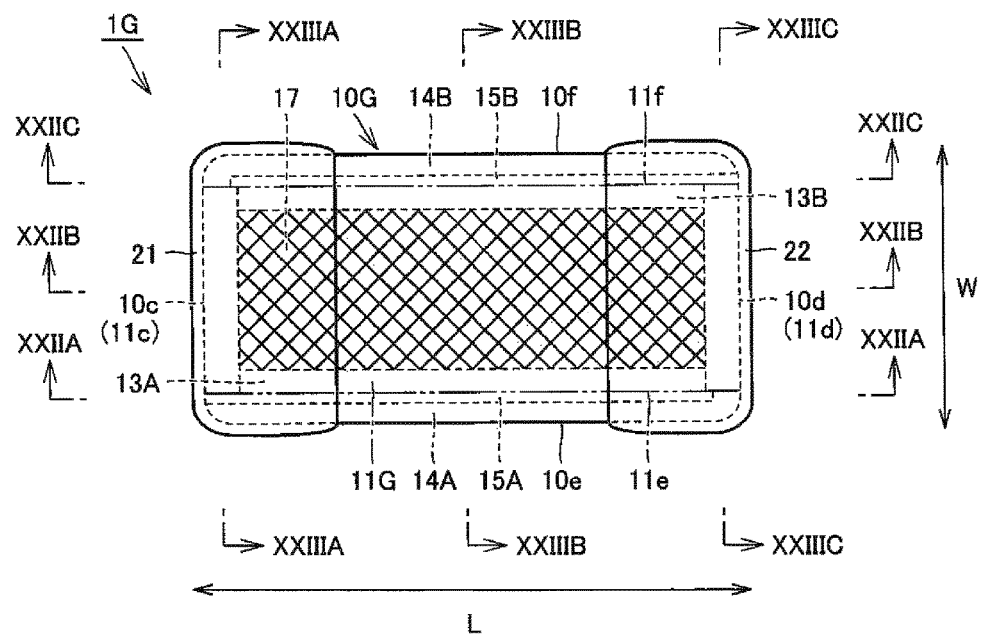
FIG. 21 is a plan view of a multilayer ceramic capacitor according to a third preferred embodiment of the present invention.
Figure 22A:
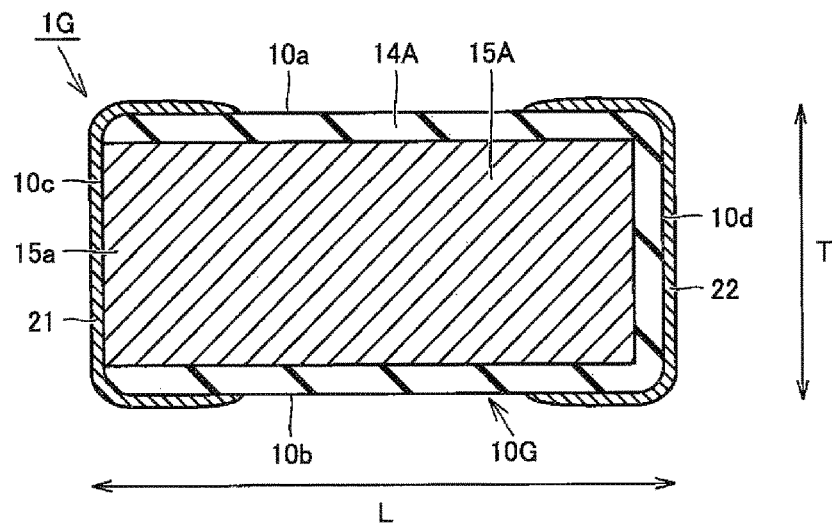
FIGS. 22A to 22C are schematic cross-sectional views of the multilayer ceramic capacitor according to the third preferred embodiment of the present invention taken along lines XXIIA-XXIIA, XXIIB-XXIIB, and XXIIC-XXIIC shown in FIG. 21.
Figure 22B:
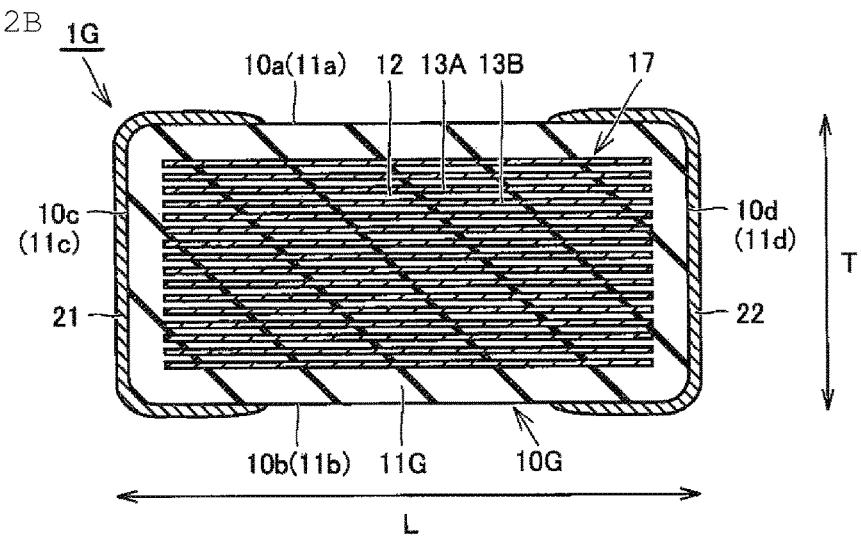
Figure 22C:
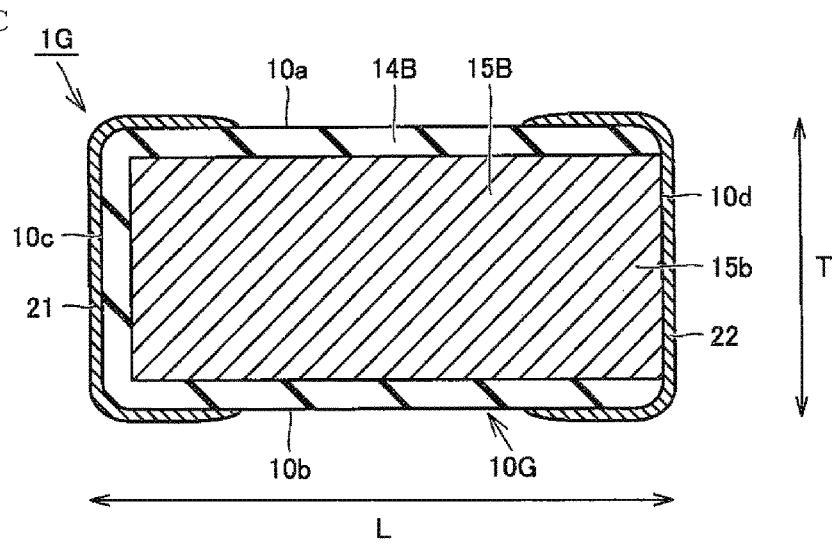
Figure 23A:
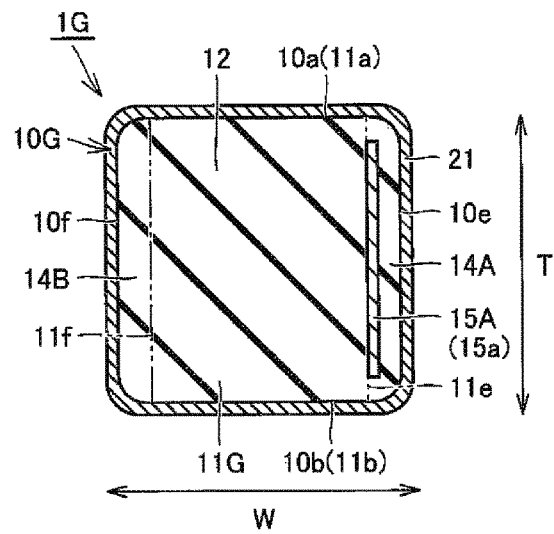
FIGS. 23A to 23C are schematic cross-sectional views of the multilayer ceramic capacitor according to the third preferred embodiment of the present invention taken along lines XXIIIA-XXIIIA, XXIIIB-XXIIIB, and XXIIIC-XXIIIC shown in FIG. 21.
Figure 23B:
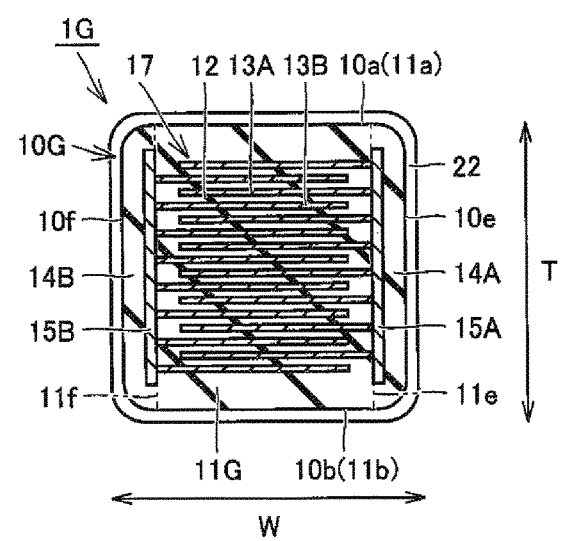
Figure 23C:
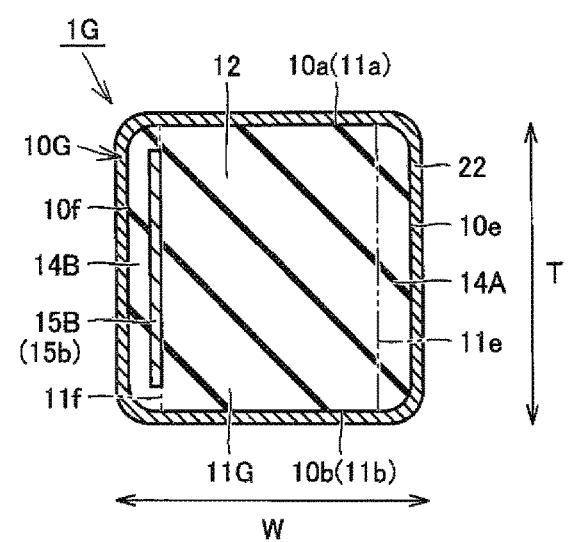

The multilayer ceramic capacitor 1F of the above configuration is achieved by the laminated structure of the laminated body 11F shown in FIG. 19 and the assembly structure of the element assembly 10F shown in FIG. 20.

As shown in FIG. 19, the laminated body 11F includes the material sheets 30B2 instead of the material sheets 30C2 shown in the first preferred embodiment described above. Here, the conductive pattern 32 of the material sheet 30B2 constitutes the second internal electrode layer for connection 13B1 configured to reach only the fourth surface 11d and the sixth surface 11f of the laminated body 11F.

The laminated body 11F produced by using such material sheets 30A, 30B1, 30B2, and 30C1 has a shape as shown in FIG. 20.

Specifically, on the fourth surface 11d, only the connecting portion 13b of the second internal electrode layer for connection 13B1 is exposed, and on the sixth surface 11f, only the second internal electrode layer for connection 13B1 is exposed. It should be noted that although not shown in FIG. 20, on the third surface 11c, only the connecting portion 13a of the first internal electrode layer for connection 13A1 is exposed, and on the fifth surface 11e, only the first internal electrode layer 13A (including the first internal electrode layer for connection 13A1) is exposed to be positioned.

On the other hand, as shown in FIG. 20, the element assembly 10F is produced with the laminated body 11F, the material sheet 30R1 shown in the first preferred embodiment described above, and the material sheet 30L3 having the configuration different from the material sheet 30L1 shown in the first preferred embodiment described above, as the material.

The material sheet 30L3 includes only the ceramic body 31 with no conductive patterns provided thereon and that defines the second covering insulating layer 14B.

Even when configured in this manner, the same effect as the effect described in the above first preferred embodiment is obtained. That is, by adopting this configuration, compared to the case where all of the first internal electrode layers and all of the second internal electrode layers are respectively extended directly to the third outer surface and the fourth outer surface and connected to the first external electrode and the second external electrode, it is possible to reduce the cross-sectional area of the conductive path between the electrostatic capacitance portion 17 and the first external electrode 21. Therefore, it is possible to increase the resistance in the portion, and to achieve higher ESR of the multilayer ceramic capacitor.

Therefore, by adopting the structure as in the multilayer ceramic capacitor 1F in this preferred embodiment, and by appropriately adjusting the number of the first internal electrode layers for connection 13A1 connected directly to the first external electrode 21, it is possible to set the ESR to a desired magnitude, and the high-density mounting is achieved.

Third Preferred Embodiment

In the following, a multilayer ceramic capacitor 1G in this preferred embodiment will be described with reference to FIGS. 21 to 25.

As shown in FIGS. 21 to 23C, when compared with the multilayer ceramic capacitor 1A in the first preferred embodiment described above, the multilayer ceramic capacitor 1G in this preferred embodiment has a configuration different in that the multilayer ceramic capacitor 1G does not include the first internal electrode layer for connection 13A1 and the second internal electrode layer for connection 13B1, and instead, the first connecting conductive layer 15A and the second connecting conductive layer 15B include the connecting portion 15a extended to the third outer surface 10c and the connecting portion 15b extended to the fourth outer surface 10d, and are respectively connected to the first external electrode 21 and the second external electrode 22 with the connecting portions 15a and 15b interposed therebetween.

Figure 24:
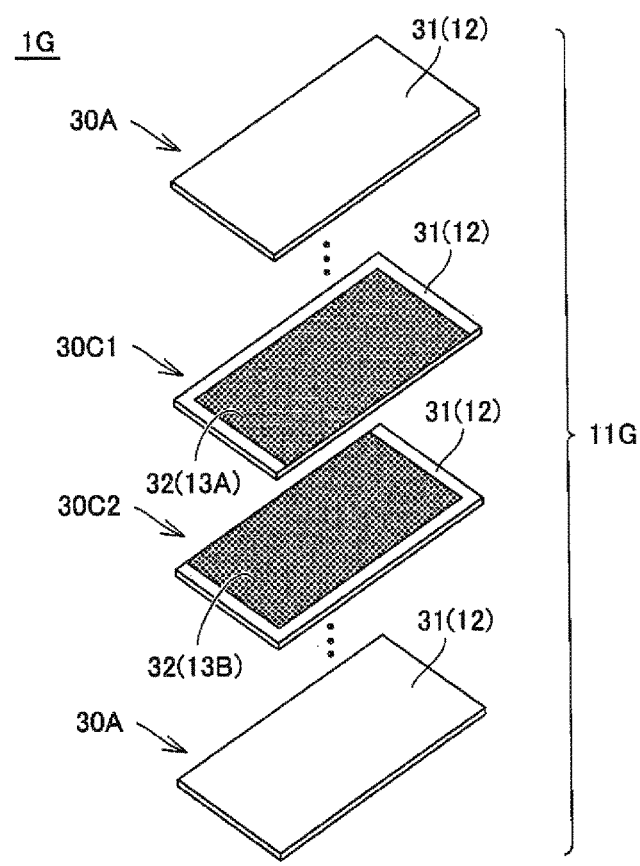
FIG. 24 is an exploded perspective view showing the laminated structure of the laminated body of the multilayer ceramic capacitor according to the third preferred embodiment of the present invention.
Figure 25:
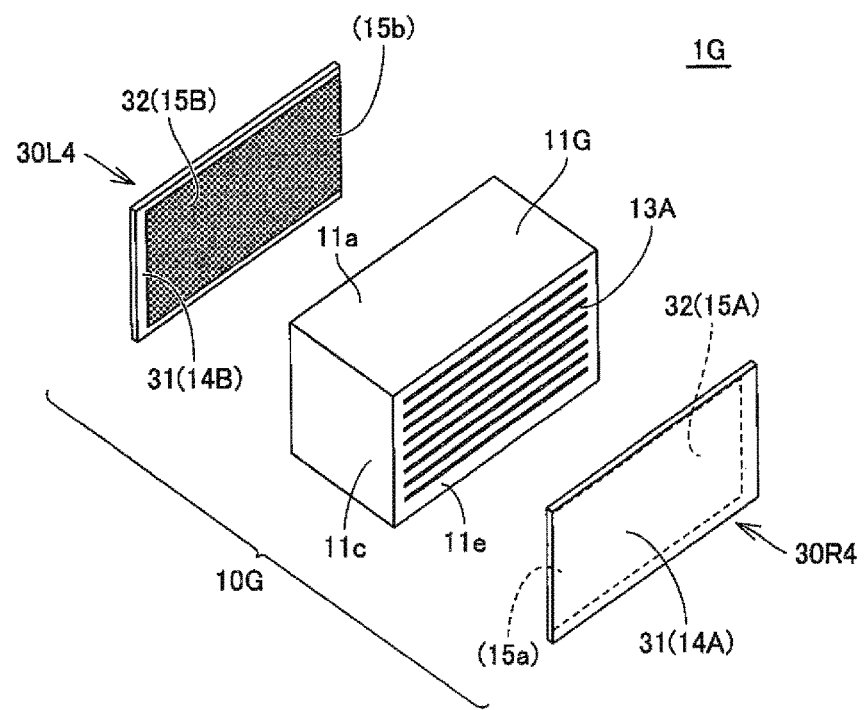
FIG. 25 is an exploded perspective view showing the assembly structure of the element assembly of the multilayer ceramic capacitor according to the third preferred embodiment of the present invention.

The multilayer ceramic capacitor 1G of the above configuration is achieved by the laminated structure of the laminated body 11G shown in FIG. 24 and the assembly structure of the element assembly 10G shown in FIG. 25.

As shown in FIG. 24, the laminated body 11G includes the material sheets 30C1 and 30C2 for all of the material sheets on which the conductive pattern is provided among the material sheets 30A, 30B1, 30B2, 30C1, and 30C2 shown in the first preferred embodiment described above.

The laminated body 11F produced by using such material sheets 30A, 30B1, and 30B2 has a shape as shown in FIG. 20.

Specifically, on the third surface 11c and fourth surface 11d, the conductive patterns are not exposed, and the entire surface is to be covered by the ceramic material. On the other hand, on the fifth surface 11e, only the first internal electrode layer 13A is exposed, and although not shown in FIG. 25, on the sixth surface 11f, only the second internal electrode layer 13B is exposed.

On the other hand, as shown in FIG. 25, the element assembly 10G is produced with the laminated body 11G, and the material sheets 30R4 and 30L4 having the configurations different from the material sheets 30R1 and 30L1 shown in the first preferred embodiment described above, as the material.

The conductive pattern 32 of the material sheet 30R4 constitutes the first connecting conductive layer 15A configured to reach only the third outer surface 10c. The conductive pattern 32 of the material sheet 30L4 constitutes the second connecting conductive layer 15B configured to reach only the fourth outer surface 10d.

It should be noted that the multilayer ceramic capacitor 1G described above in this preferred embodiment is produced based on the production flow similar to the production flow of the multilayer ceramic capacitor described in the first preferred embodiment described above.

There is a state where all of the plurality of first internal electrode layers 13A are connected by the first connecting conductive layer 15A, and all of the plurality of first internal electrode layers 13A are electrically connected to the first external electrode 21 with the first connecting conductive layer 15A interposed therebetween. In addition, in the multilayer ceramic capacitor 1G, there is a state where all of the plurality of second internal electrode layers 13B are connected by the second connecting conductive layer 15B, and all of the plurality of second internal electrode layers 13B are electrically connected to the second external electrode 22 with the second connecting conductive layer 15B interposed therebetween. Therefore, compared to the case where all of the first internal electrode layers and all of the second internal electrode layers are respectively extended directly to the third outer surface and the fourth outer surface and connected to the first external electrode and the second external electrode, it is possible to reduce the cross-sectional areas of the conductive paths between the electrostatic capacitance portion 17 and the first external electrode 21 and between the electrostatic capacitance portion 17 and the second external electrode 22. Therefore, it is possible to increase the resistance in the portion, and to achieve higher ESR of the multilayer ceramic capacitor.

On the other hand, there is a state where both of the first connecting conductive layer 15A and the second connecting conductive layer 15B are buried inside the element assembly 10G. Therefore, the first connecting conductive layer 15A and the second connecting conductive layer 15B are not directly connected to the conductive patterns and lands provided on the wiring board with the solder bonding material and the like interposed therebetween during the mounting, and therefore, the desired ESR is reliably obtained. Furthermore, the multilayer ceramic capacitor including only two conventional general external electrodes is easily replaced, and the substitution is smoothly achieved without the need for design changes and the like of the wiring board. In addition, by adopting the configuration, it is easy to secure the distance between the first external electrode and the second external electrode 22 in designing, and therefore, the miniaturization of the multilayer ceramic capacitor itself is also possible.

Therefore, by adopting the structure as in the multilayer ceramic capacitor 1G in this preferred embodiment, it is possible to set the ESR to a desired magnitude, and the high-density mounting is achieved.

It should be noted that in the multilayer ceramic capacitor 1G in this preferred embodiment, during the mounting on the wiring board, even in any of the cases where the first outer surface 10a of the element assembly 10G is mounted so as to face the wiring board and where the second outer surface 10b of the element assembly 10G is mounted so as to face the wiring board, the same electrical characteristics are obtained, and the degree of freedom of the mounting is increased.

Although the description is made by exemplifying the cases where only the first connecting conductive layer 15A among the plurality of first internal electrode layers 13A and the first connecting conductive layer 15A preferably is extended to the third outer surface 10c of the element assembly 10G, and connected to the first external electrode 21, and where only the second connecting conductive layer 15B among the plurality of second internal electrode layers 13B and the second connecting conductive layer 15B preferably is extended to the fourth outer surface 10d of the element assembly 10G, and connected to the second external electrode 22, a multilayer ceramic capacitor where the high ESR is achieved is able to be obtained even when the multilayer ceramic capacitor is not necessarily configured in this manner.

For example, even when all of the plurality of first internal electrode layers 13A are extended to the third outer surface 10c of the element assembly 10G, and connected to the first external electrode 21, such that all of the plurality of first internal electrode layers 13A are configured as the first internal electrode layers for connection 13A1, and all of the plurality of second internal electrode layers 13B are extended to the fourth outer surface 10d of the element assembly 10G, and connected to the second external electrode 22, such that all of the plurality of second internal electrode layers 13B are configured as the second internal electrode layers for connection 13B1, it is possible to adjust the ESR to a desired magnitude by providing the first connecting conductive layer 15A and the second connecting conductive layer 15B as described above.

That is, in the above case, when the cross-sectional area of the connecting portions 13a of the plurality of first internal electrode layers for connection 13A1 and the cross-sectional area of the connecting portions 13b of the plurality of second internal electrode layers for connection 13B1 are configured sufficiently small (for example, the sizes of the connecting portions 13a and the connecting portions 13b in the width direction W are configured sufficiently small as in the third modification based on the first preferred embodiment described above), the resistance in these connecting portions 13a and 13b is able to be significantly increased, however, on the contrary, the cross-sectional area of the connecting portion 15a of the first connecting conductive layer 15A and the cross-sectional area of the connecting portion 15b of the second connecting conductive layer 15B, the connection area between the first connecting conductive layer 15A and each of the plurality of first internal electrode layers 13A and the connection area between the second connecting conductive layer 15B and each of the plurality of second internal electrode layers 13B, and the like are adjusted appropriately, such that the resistance in these portions is also reduced.

Therefore, when configured in this manner, while the common configuration is used as the laminated body, the conductive pattern on the raw material sheet for covering pasted on the laminated body is variously changed, such that the multilayer ceramic capacitor which has different ESR characteristics and achieves higher ESR is easily produced.

In addition, in the above case, when all of the first internal electrode layers 13A and all of the second internal electrode layers 13B are respectively connected to the first external electrode 21 and the second external electrode 22 respectively as the first internal electrode layers for connection 13A1 and the second internal electrode layers for connection 13B1 without reducing the cross-sectional area of the connecting portions 13a and 13b, and furthermore the first connecting conductive layer 15A and the second connecting conductive layer 15B are respectively connected to the first external electrode 21 and the second external electrode 22, a multilayer ceramic capacitor where lower ESR is achieved compared with the conventional structure is also defined.

Fourth Preferred Embodiment

In the following, a multilayer ceramic capacitor 1H in this preferred embodiment will be described with reference to FIG. 26.

Figure 26:
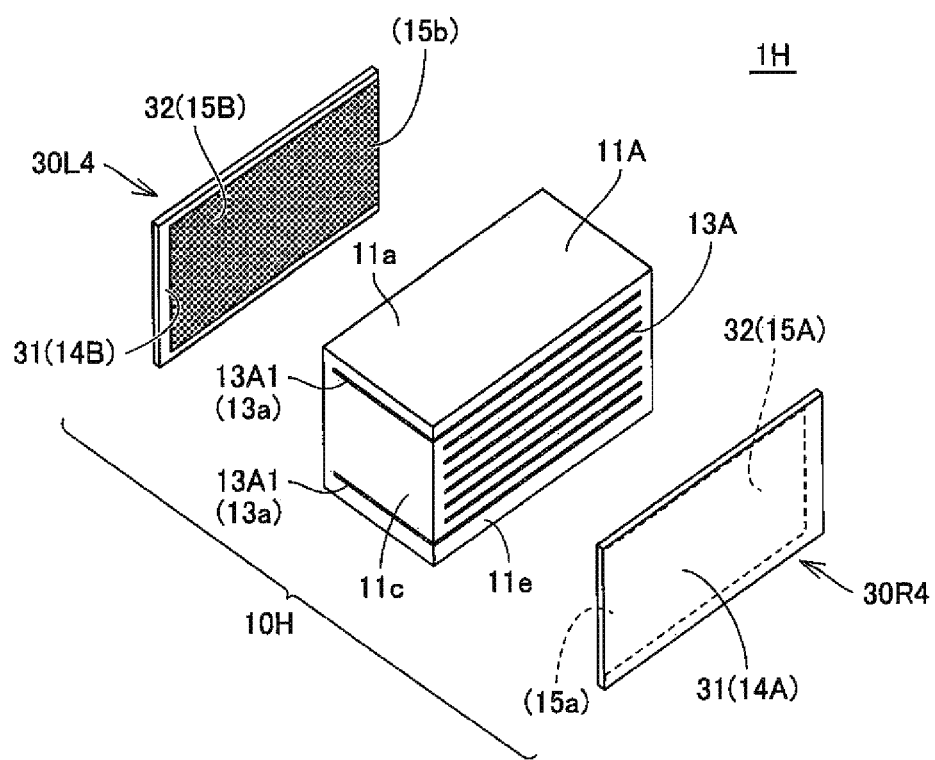
FIG. 26 is an exploded perspective view showing the assembly structure of the element assembly of a multilayer ceramic capacitor according to a fourth preferred embodiment of the present invention.

As shown in FIG. 26, the multilayer ceramic capacitor 1H in this preferred embodiment includes a laminated body 11A having the same structure as the structure shown in the first preferred embodiment described above, and is different from that of the first preferred embodiment described above in that the element assembly 10H is produced using the material sheets 30R4 and 30L4 shown in the third preferred embodiment described above.

When configured in this manner, unlike in the first preferred embodiment described above, not only the first internal electrode layers for connection 13A1, but also the first connecting conductive layer 15A is extended to the third outer surface 10c of the element assembly 10H, and connected to the first external electrode 21, and not only the second internal electrode layers for connection 13B1, but also the second connecting conductive layer 15B is extended to the fourth outer surface 10d of the element assembly 10H, and connected to the second external electrode 22.

Even in the case of such a configuration, the same effect as described in the above first preferred embodiment is obtained, and the numbers of the first internal electrode layers for connection 13A1 and the second internal electrode layers for connection 13B1 respectively connected directly to the first external electrode 21 and the second external electrode 22 are appropriately adjusted, such that it is possible to set the ESR to a desired magnitude, and high-density mounting is achieved.

In any of the first to fourth preferred embodiments and their modifications of the present invention described above, in the case of forming the first covering dielectric layer and the second covering insulating layer, and the first connecting conductive layer and the second connecting conductive layer, the description is made by exemplifying the case where a pair of material sheets respectively including the ceramic body to be the first covering insulating layer and the second covering insulating layer, and the conductive pattern to be the first connecting conductive layer and the second connecting conductive layer are respectively pasted on the fifth surface and the sixth surface of the laminated body, however, it is also possible to use other methods as the method of forming the first covering insulating layer and the second covering insulating layer, and the first connecting conductive layer and the second connecting conductive layer.

For example, it may be sufficient to first paste the conductive sheets to be the first covering insulating layer and the second covering insulating layer on the fifth surface and the sixth surface of the laminated body, and to subsequently paste the ceramic sheets to be the first covering insulating layer and the second covering insulating layer. In addition, the first covering insulating layer and the second covering insulating layer may be formed by the conductive paste being applied to the fifth surface and the sixth surface of the laminated body and being solidified, and may be formed by the ceramic slurry to be the first covering dielectric layer and the second covering insulating layer being applied and being solidified.

In addition, in the first to fourth preferred embodiments and their modifications of the present invention described above, the description is made by exemplifying the case where the first covering insulating layer and the second covering insulating layer respectively include the first covering insulating layer and second covering insulating layer made of a ceramic material, however, the first covering insulating layer and the second covering insulating layer may be constituted by other materials (for example, a resin material, and the like) as long as the insulating property is secured.

In addition, the characteristic configurations described in the first to fourth preferred embodiments and their modifications of the present invention described above are able to be combined with one another naturally without departing from the gist of the present invention.

Thus, the above-described preferred embodiments and the modifications disclosed here are illustrative in all respects, and are not intended to be limiting. The technical scope of the present invention is defined by the scope of the appended claims, and includes all modifications within the meaning and the scope equivalent to the description of the appended claims.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:
1. A capacitor component comprising:
an element assembly including:

a first outer surface and a second outer surface opposing each other;
a third outer surface and a fourth outer surface opposing each other; and
a fifth outer surface and a sixth outer surface opposing each other;
a first external electrode disposed on the third outer surface; and
a second external electrode disposed on the fourth outer surface; wherein
the element assembly includes a plurality of dielectric layers and a plurality of internal electrode layers alternately laminated in a laminating direction perpendicular or substantially perpendicular to the first outer surface;
the plurality of internal electrode layers include:
a plurality of first internal electrode layers electrically connected to the first external electrode; and
a plurality of second internal electrode layers electrically connected to the second external electrode; wherein
the element assembly further includes:
a first connecting conductive layer extending along the fifth outer surface and connecting to an end portion on the fifth outer surface side of each of the plurality of first internal electrode layers; and
a first covering insulating layer covering the first connecting conductive layer and defining the fifth outer surface;
at least one of the plurality of first internal electrode layers extends to the third outer surface and connect to the first external electrode;
at least one of the plurality of first internal electrode layers is separated from the third outer surface;
an outer edge of each of the plurality of first internal electrode layers linearly extends along the fourth outer surface; and
an outer edge of each of the plurality of second internal electrode layers linearly extends along the third outer surface.

2. The capacitor component according to claim 1, wherein the first connecting conductive layer extends to the third outer surface and is connected to the first external electrode.

3. The capacitor component according to claim 1, wherein the element assembly includes:
a second connecting conductive layer extending along the sixth outer surface and connecting to an end portion on the sixth outer surface side of each of the plurality of second internal electrode layers; and
a second covering insulating layer covering the second connecting conductive layer and defining the sixth outer surface; wherein
at least one of the plurality of second internal electrode layers extend to the fourth outer surface and connect to the second external electrode; and
at least one of the plurality of second internal electrode layers are separated from the fourth outer surface.

4. The capacitor component according to claim 3, wherein the second connecting conductive layer is extended to the fourth outer surface and connected to the second external electrode.

5. The capacitor component according to claim 3, wherein the element assembly includes:
a plurality of first auxiliary conductive layers positioned in a same plane perpendicular or substantially perpendicular to the laminating direction as each of the plurality of second internal electrode layers and connected to the first connecting conductive layer; and
a plurality of second auxiliary conductive layers positioned in a same plane perpendicular or substantially perpendicular to the laminating direction as each of the plurality of first internal electrode layers and connected to the second connecting conductive layer.

6. The capacitor component according to claim 1, wherein the element assembly includes a second covering insulating layer defining the sixth outer surface; and
the plurality of the second internal conductive layer are directly covered by the second covering insulating layer.

7. The capacitor component according to claim 3, wherein the first connecting conductive layer is extended to the third outer surface and connected to the first external electrode; and
the second connecting conductive layer is extended to the fourth outer surface and connected to the second external electrode.

8. The capacitor component according to claim 3, wherein all of the first internal electrode layers are connected to the first external electrode;
all of the second internal electrode layers are connected to the second external electrode;
the first connecting conductive layer is connected to the first external electrode; and
the second connecting conductive layer is connected to the second external electrode.

9. The capacitor component according to claim 3, wherein the plurality of first internal electrode layers and the first connecting conductive layer are extended to the third outer surface and connected to the first external electrode; and
the plurality of second internal electrode layers and the second connecting conductive layer are extended to the fourth outer surface and connected to the second external electrode.

10. A capacitor component comprising:
an element assembly including:
a first outer surface and a second outer surface opposing each other;
a third outer surface and a fourth outer surface opposing each other; and
a fifth outer surface and a sixth outer surface opposing each other;
a first external electrode disposed on the third outer surface; and
a second external electrode disposed on the fourth outer surface; wherein
the element assembly includes a plurality of dielectric layers and a plurality of internal electrode layers alternately laminated in a laminating direction perpendicular or substantially perpendicular to the first outer surface;
the plurality of internal electrode layers include:
a plurality of first internal electrode layers electrically connected to the first external electrode; and
a plurality of second internal electrode layers electrically connected to the second external electrode;
the element assembly further includes:
a first connecting conductive layer extending along the fifth outer surface and connecting to an end portion on the fifth outer surface side of each of the plurality of first internal electrode layers; and a first covering insulating layer covering the first connecting conductive layer and defining the fifth outer surface;

the first connecting conductive layer is extended to the third outer surface and connected to the first external electrode;

an outer edge of each of the plurality of first internal electrode layers linearly extends along the fourth outer surface; and an outer edge of each of the plurality of second internal electrode layers linearly extends along the third outer surface.

11. The capacitor component according to claim 10, wherein the element assembly includes:
a second connecting conductive layer extending along the sixth outer surface and connecting to an end portion on the sixth outer surface side of each of the plurality of second internal electrode layers; and
a second covering insulating layer covering the second connecting conductive layer and defining the sixth outer surface; wherein
the second connecting conductive layer is extended to the fourth outer surface and connected to the second external electrode.

12. The capacitor component according to claim 11, wherein the element assembly includes:
a first auxiliary conductive layer positioned in a same plane perpendicular or substantially perpendicular to the laminating direction as each of the plurality of second internal electrode layers and connected to the first connecting conductive layer; and
a second auxiliary conductive layer positioned in a same plane perpendicular or substantially perpendicular to the laminating direction as each of the plurality of first internal electrode layers and connected to the second connecting conductive layer.

13. The capacitor component according to claim 11, wherein
the element assembly includes a second covering insulating layer defining the sixth outer surface; and
the plurality of the second internal conductive layer are directly covered by the second covering insulating layer.

14. The capacitor component according to claim 11, wherein
the first connecting conductive layer is extended to the third outer surface and connected to the first external electrode; and
the second connecting conductive layer is extended to the fourth outer surface and connected to the second external electrode.

15. The capacitor component according to claim 11, wherein
all of the first internal electrode layers are connected to the first external electrode;
all of the second internal electrode layers are connected to the second external electrode;
the first connecting conductive layer is connected to the first external electrode; and
the second connecting conductive layer is connected to the second external electrode.

16. The capacitor component according to claim 11, wherein
the plurality of first internal electrode layers and the first connecting conductive layer are extended to the third outer surface and connected to the first external electrode; and
the plurality of second internal electrode layers and the second connecting conductive layer are extended to the fourth outer surface and connected to the second external electrode.

* * * * *